US011136000B2

(12) United States Patent
Cumbo

(10) Patent No.: US 11,136,000 B2
(45) Date of Patent: Oct. 5, 2021

(54) TOUCH AND GESTURE PAD FOR SWIPE/TAP ENTRY VERIFICATION SYSTEM

(71) Applicant: MAGNA CLOSURES INC., Newmarket (CA)

(72) Inventor: Francesco Cumbo, Pisa (IT)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 16/186,665

(22) Filed: Nov. 12, 2018

(65) Prior Publication Data

US 2019/0152433 A1 May 23, 2019

Related U.S. Application Data

(60) Provisional application No. 62/587,532, filed on Nov. 17, 2017.

(51) Int. Cl.
| | |
|---|---|
| *B60R 25/20* | (2013.01) |
| *B60R 25/01* | (2013.01) |
| *G06F 3/044* | (2006.01) |
| *G06F 3/041* | (2006.01) |
| *B60R 25/23* | (2013.01) |
| *G06F 3/0488* | (2013.01) |
| *G07C 9/00* | (2020.01) |

(Continued)

(52) U.S. Cl.
CPC .......... *B60R 25/2045* (2013.01); *B60R 25/01* (2013.01); *B60R 25/23* (2013.01); *G06F 1/3262* (2013.01); *G06F 3/044* (2013.01); *G06F 3/0416* (2013.01); *G06F 3/04883* (2013.01); *G07C 9/00658* (2013.01); *F21V 23/003* (2013.01); *G06F 2203/04105* (2013.01); *G06F 2203/04108* (2013.01)

(58) Field of Classification Search
None
See application file for complete search history.

(56) References Cited

U.S. PATENT DOCUMENTS

| | | |
|---|---|---|
| 7,637,631 B2 | 12/2009 | McDermott et al. |
| 7,911,321 B2 | 3/2011 | Bingle et al. |
| | (Continued) | |

FOREIGN PATENT DOCUMENTS

DE      102008021379 B3 *  7/2009  ............. E05B 81/76

*Primary Examiner* — Daniell L Negron
(74) *Attorney, Agent, or Firm* — Dickinson Wright PLLC

(57) ABSTRACT

A system and method for providing access to a vehicle is provided. The system includes a plurality of capacitive sensors circumferentially spaced from one another in a circular arrangement defining a plurality of sensor nodes for receiving a touch input from a user in the form of a touch or a swipe. A controller unit is coupled to the plurality of capacitive sensors and a power source and is in communication with a plurality of vehicle systems and a latch mechanism. The controller unit detects a plurality of changes in capacitance of the plurality of capacitive sensors due to the touch input and determines whether the plurality of changes in capacitance matches a gesture sequence within a predetermined amount of time. The controller unit controls the latch mechanism in response to the communication with vehicle systems and changes in capacitance matching the gesture sequence within the predetermined amount of time.

20 Claims, 17 Drawing Sheets

(51) Int. Cl.
  *G06F 1/3234* (2019.01)
  *F21V 23/00* (2015.01)
  *F21Y 115/10* (2016.01)
  *F21Y 113/13* (2016.01)
  *F21W 107/10* (2018.01)

(56) References Cited

U.S. PATENT DOCUMENTS

| | | |
|---|---|---|
| 8,113,695 B2 | 2/2012 | Meinke et al. |
| 8,400,265 B2 | 3/2013 | Sarioglu et al. |
| 9,349,552 B2 * | 5/2016 | Huska .................... H01H 13/85 |
| 9,499,127 B2 * | 11/2016 | Pribisic .................. G06F 3/044 |
| 9,518,408 B1 * | 12/2016 | Krishnan ................ E05B 81/82 |
| 9,925,953 B2 | 3/2018 | Pribisic et al. |
| 10,394,393 B2 | 8/2019 | Ramakrishnan et al. |
| 10,514,797 B2 | 12/2019 | Kugler et al. |
| 10,635,248 B2 | 4/2020 | Hinson et al. |
| 2002/0180707 A1 * | 12/2002 | Sato ...................... G06F 3/0202 |
| | | 345/169 |
| 2003/0029210 A1 | 2/2003 | Budzynski et al. |
| 2006/0262549 A1 | 11/2006 | Schmidt et al. |
| 2010/0085147 A1 | 4/2010 | McCall |
| 2015/0353033 A1 | 12/2015 | Pribisic et al. |
| 2017/0260778 A1 | 9/2017 | Witte et al. |
| 2018/0058837 A1 | 3/2018 | Dektor et al. |
| 2018/0367139 A1 | 12/2018 | Pribisic et al. |
| 2020/0011093 A1 | 1/2020 | Ullrich et al. |
| 2020/0011096 A1 | 1/2020 | Leonardi et al. |

\* cited by examiner

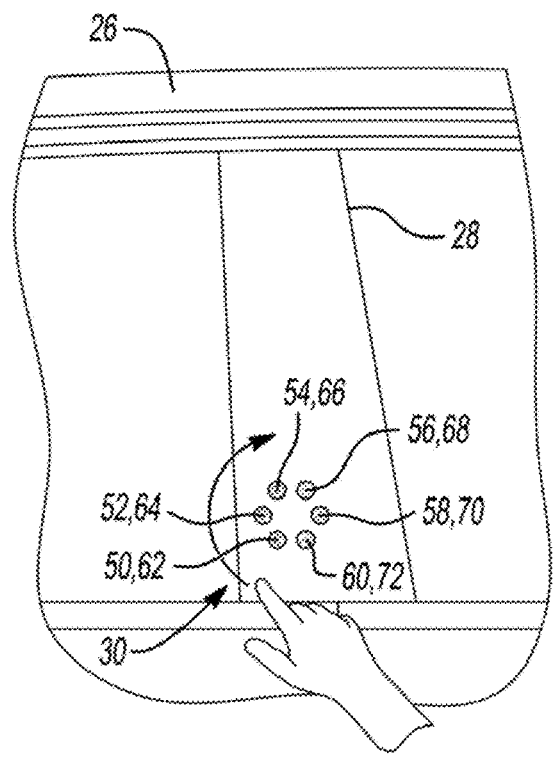
_Fig-3A_
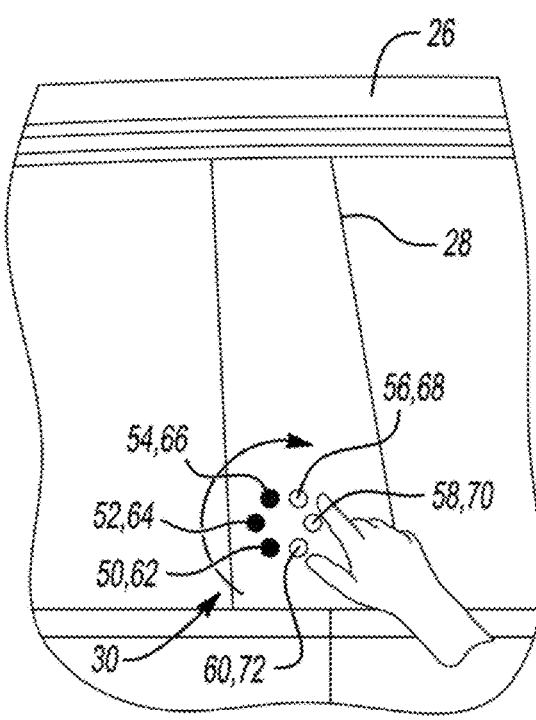
_Fig-3B_
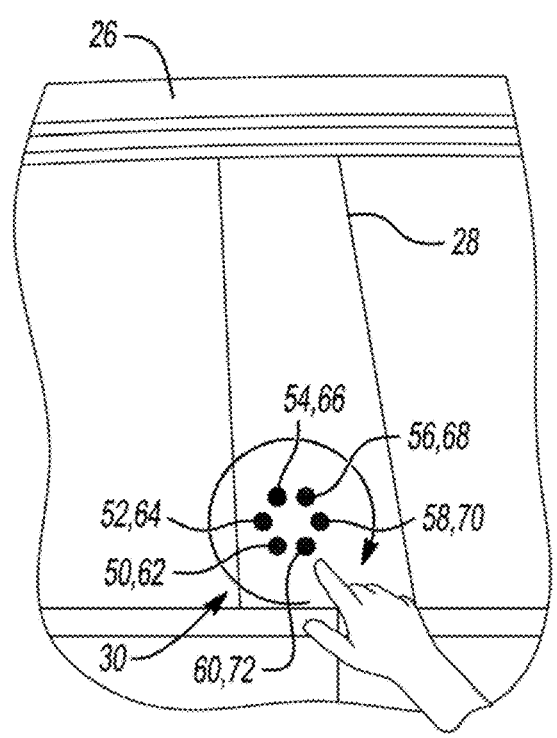
_Fig-3C_

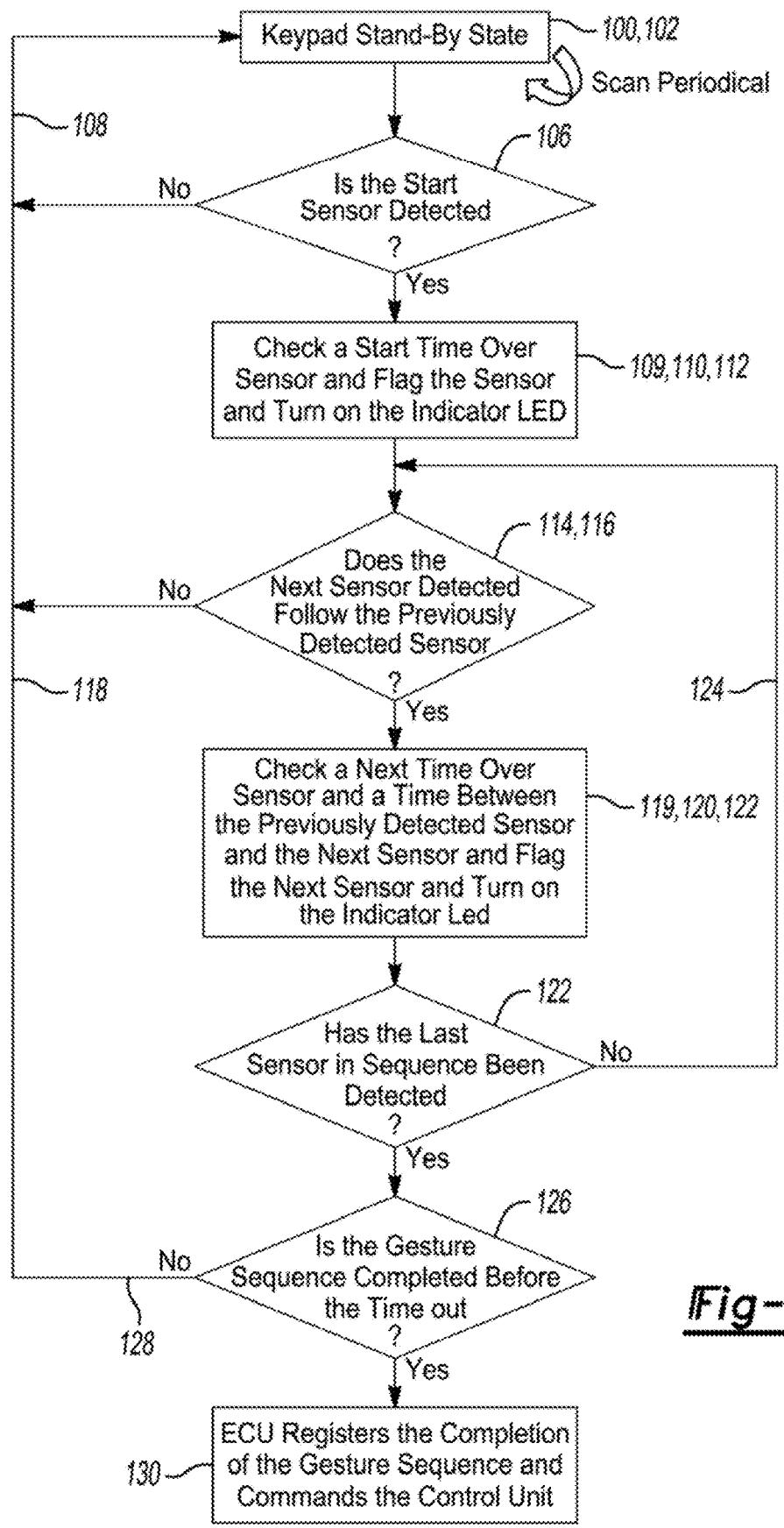

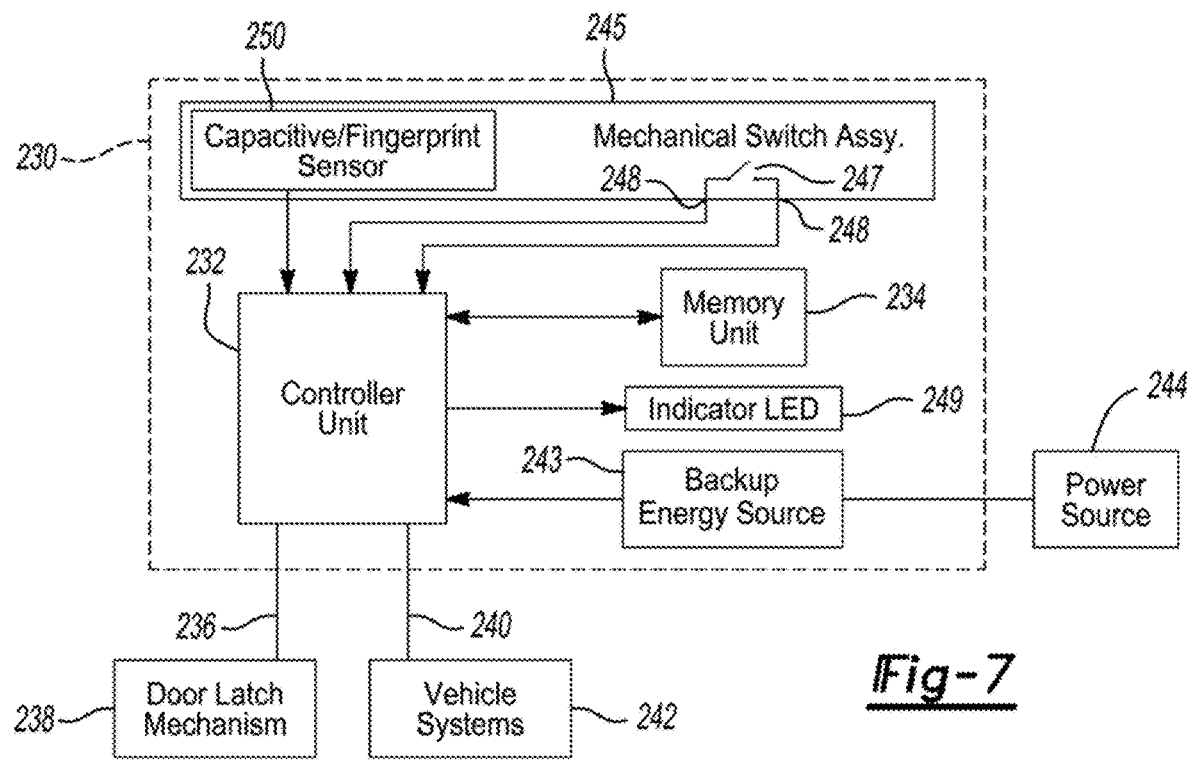
*Fig-7*
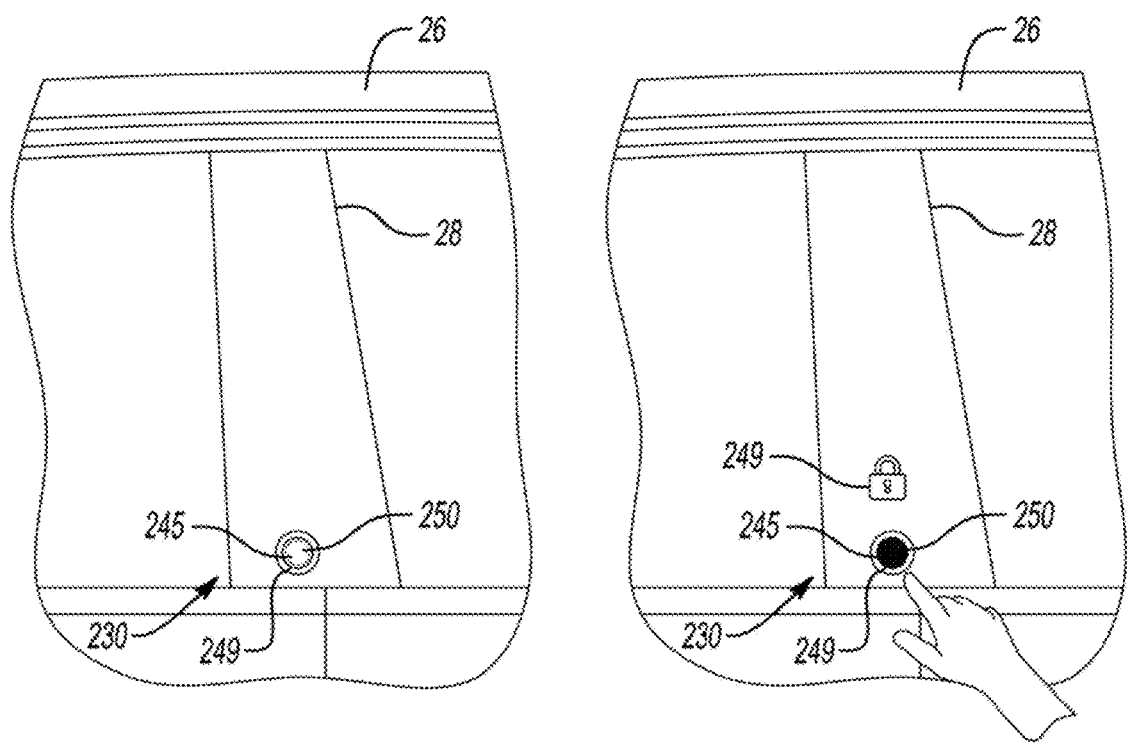
*Fig-8A*  *Fig-8B*

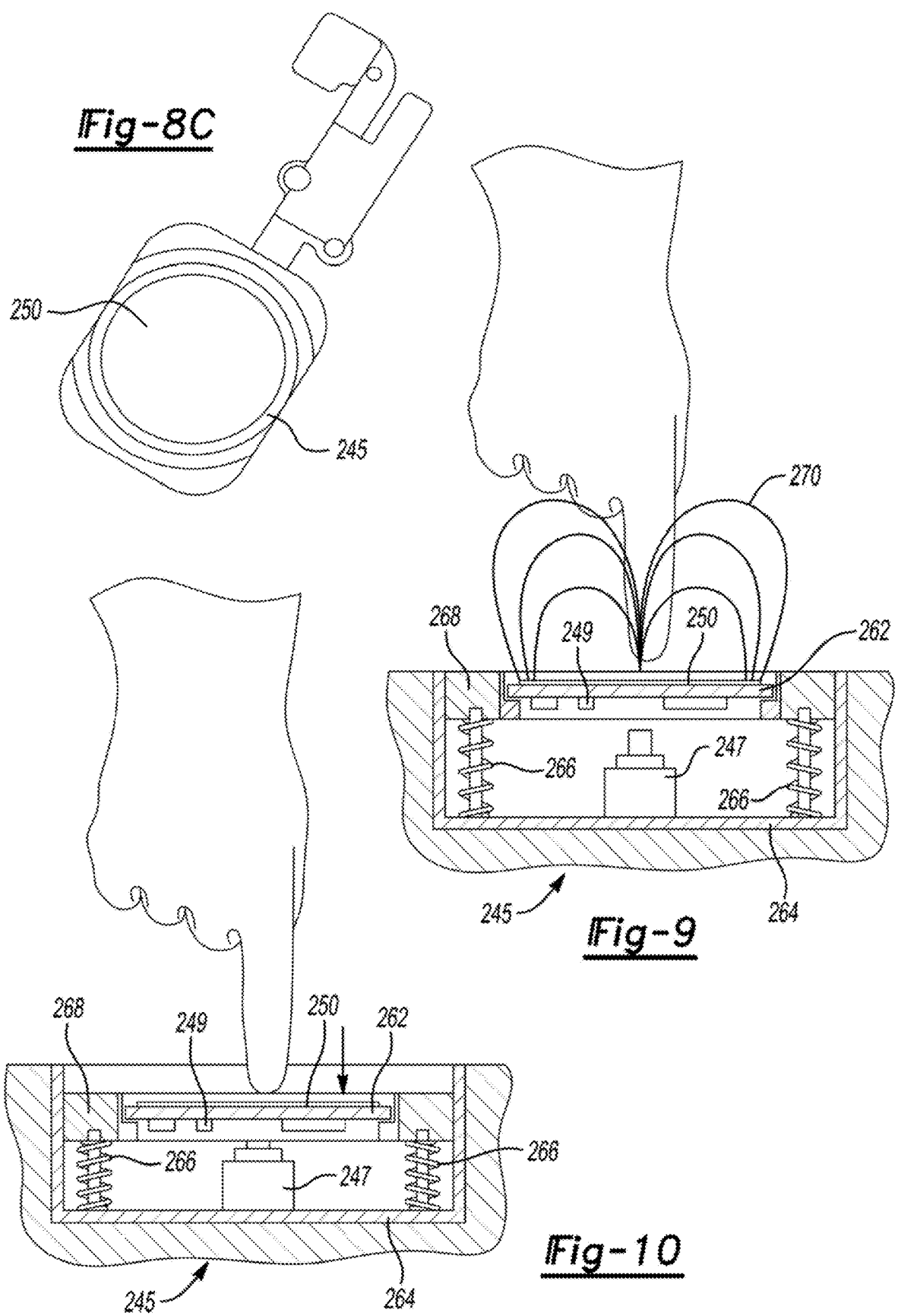

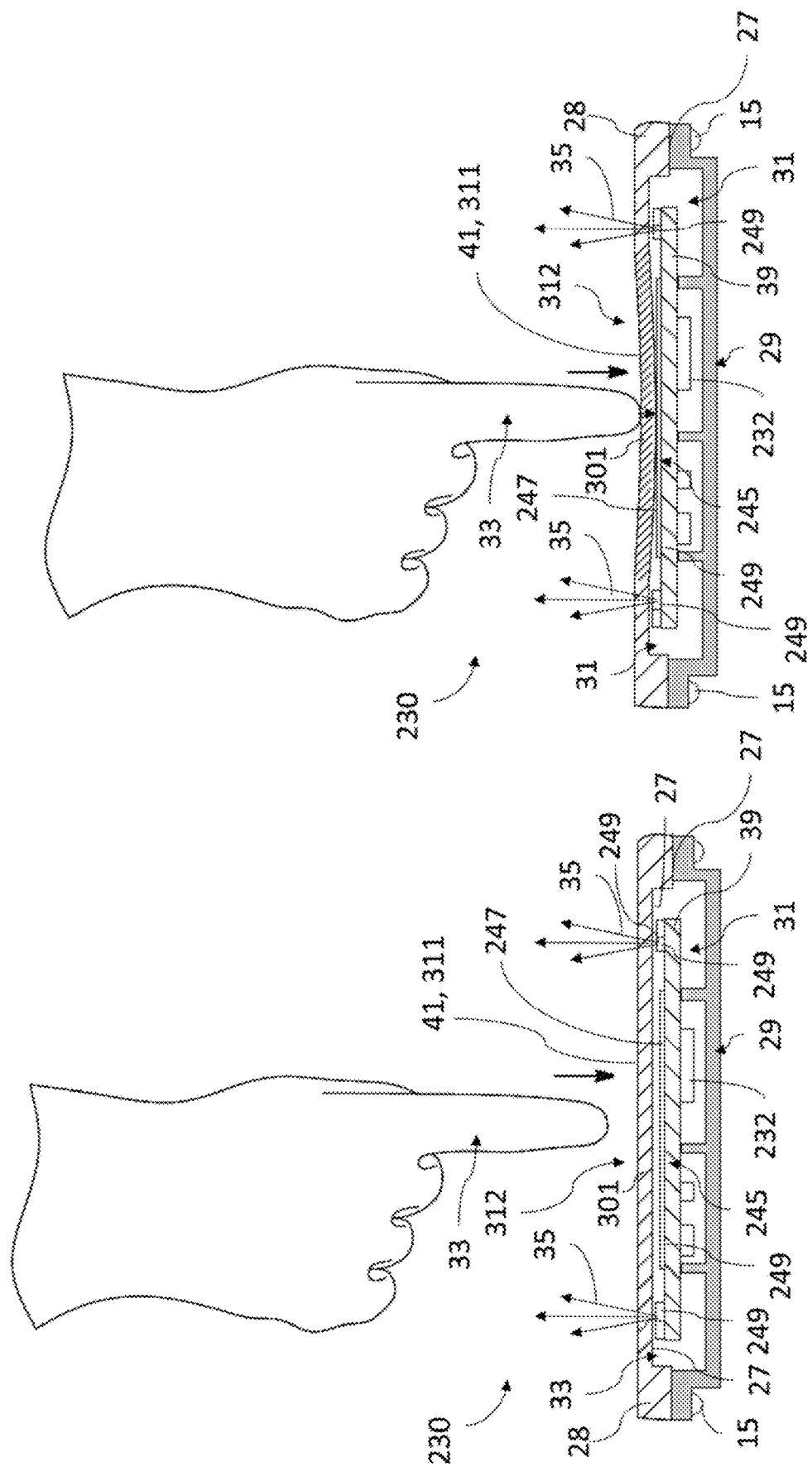

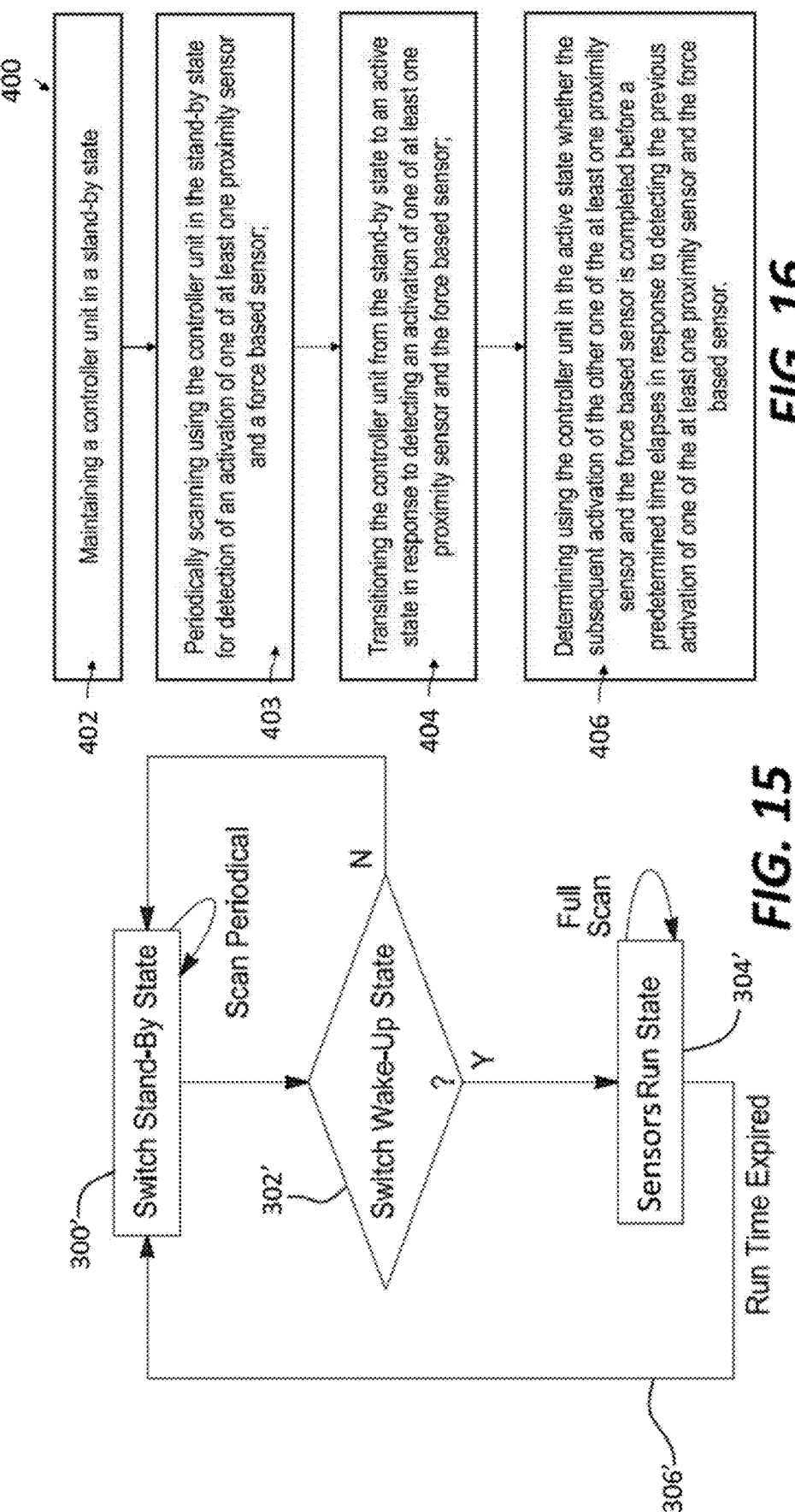

TOUCH AND GESTURE PAD FOR SWIPE/TAP ENTRY VERIFICATION SYSTEM

CROSS-REFERENCE TO RELATED APPLICATIONS

This utility application claims the benefit of U.S. Provisional Application No. 62/587,532 filed Nov. 17, 2017. The entire disclosure of the above application is incorporated herein by reference.

FIELD

The present disclosure relates generally to an entry system for motor vehicles and, more particularly, to a touch and gesture pad for a swipe/tap entry verification system and a method of operating the touch and gesture pad.

BACKGROUND

This section provides background information related to the present disclosure which is not necessarily prior art.

Many passenger vehicles and trucks are now equipped with keyless entry systems alone or in combination with a traditional mechanical-type (i.e. key) entry system. In many instances, the keyless entry system includes a portable device, such as a key fob, having pushbuttons that can be manipulated to unlock/lock the vehicle doors as well as perform other functions (i.e., selective activation of alarms, headlights and/or the ignition system) through encoded RF signals transmitted to a vehicle-installed receiver. Typically, the signals supplied to the receiver are primarily used to control the selective locking and unlocking of a power-operated door latch mechanism.

Certain vehicles may be equipped with a vehicle-mounted keyless entry system. Typically, a touch device, such as a keypad, is mounted to the vehicle in close proximity to the door handle (i.e. on the door or the B-pillar) which enables an authorized user to enter a passcode consisting of a sequence of alpha or numerical codes. Upon verification of the passcode, an on-board controller unit controls operation of the power-operated door latch mechanism. The keypad may also be used to control other vehicle operational functions such as, for example, power release of the gas tank cover or the tailgate lift system following entry and verification of the correct passcode. Some keypads use pushbuttons and/or switches to enter the authentication code. One example of a touchless keyless entry keypad associated with a vehicle entry system is disclosed in U.S. Pat. No. 8,400,265 the entire disclosure of which is herein incorporated by reference. As disclosed in the '265 patent, a plurality of proximity sensors, such as capacitive sensors, are used as the code input interfaces associated with the keypad.

Still other vehicles may be equipped with a passive keyless entry (PKE) system which utilizes a transmitter carried by the user to provide a signal to the vehicle-mounted receiver for controlling activation of the power-operated door latch mechanism with some limited tactile input from the user. Typically, close proximity of the transmitter to the vehicle and a single action, such as touching the door handle or waving in proximity to a motion detector, act to control the locking and unlocking function of the vehicle door.

While such keyless entry systems have found widespread applications in vehicle door systems (i.e., passenger doors, tailgates and closure doors), a need exists to continually advance the art and address known deficiencies associated with conventional keyless entry systems. For example, a need exists to provide additional authentication protocol to improve security and limit unintended access to the vehicle's passenger and/or storage compartments. Another need to be addressed includes limiting electrical power usage associated with "false activation" of the keypad caused by inadvertent inputs to the keypad. Such inadvertent inputs can, for example, be caused by rain, flying debris or carwash spray jets contacting the capacitive sensors associated with the keypad. As a byproduct of solving such deficiencies, inadvertent operation of the door latch mechanism will be prevented to maintain the door in its proper locked or unlocked state.

A need therefore exists for an improved method and system of keyless entry of passenger entry doors and closure members in motor vehicles and other devices. Accordingly, a solution that addresses, at least in part, the above-noted shortcomings and advances the art is desired.

SUMMARY

This section provides a general summary of the present disclosure and is not intended to be interpreted as a comprehensive disclosure of its full scope or all of its features, aspects and objectives.

Accordingly, it is an aspect of the present disclosure to provide a touch and gesture pad for providing access to a vehicle that overcomes the above-noted shortcomings. The touch and gesture pad includes a plurality of capacitive sensors circumferentially spaced from one another in a circular arrangement defining a plurality of sensor nodes for receiving a touch input from a user in the form of a touch or a swipe. A controller unit is coupled to the plurality of capacitive sensors and a power source. The touch and gesture pad is also in communication with a plurality of vehicle systems and a latch mechanism. The controller unit is configured to communicate with the plurality of vehicle systems and detect a plurality of changes in capacitance of the plurality of capacitive sensors due to the touch input. The controller unit is also configured to determine whether the plurality of changes in capacitance matches a gesture sequence within a predetermined amount of time. The controller unit is additionally configured to control the latch mechanism in response to communication with the plurality of vehicle systems and in response to the plurality of changes in capacitance matching the gesture sequence within the predetermined amount of time.

It is another aspect of the disclosure to provide a touch and gesture pad for providing access to a vehicle that includes a mechanical switch assembly that includes a switch movable between a rest position and an activated position in response to a force input from a user. The touch and gesture pad also includes a capacitive sensor disposed on the switch and defining a sensor node for receiving a touch input from the user. A controller unit is coupled to the mechanical switch and the capacitive sensor and a power source. The touch and gesture pad is in communication with a plurality of vehicle systems and a latch mechanism. The controller unit is configured to communicate with the plurality of vehicle systems and detect a change in capacitance of the capacitive sensor due to the touch input and movement of the switch to the activated position due to the force input. The controller unit is also configured to determine whether the change in capacitance and movement of the switch occurs within a predetermined amount of time. The controller unit is additionally configured to control the latch mechanism in response to communication with the plurality of vehicle systems and in response to the change in capacitance and movement of the switch occurring within the predetermined amount of time.

In accordance with yet another aspect, there is provided a touch and gesture pad for providing access to a vehicle, including a plurality of proximity sensors spaced from one another in a non-linear arrangement defining a plurality of tous for receiving an input from a user in the form of a touch or a swipe, a controller unit coupled to the plurality of proximity sensors and in communication with a latch mechanism and configured to detect a plurality of activations of the plurality of proximity sensors due to the input, determine whether the plurality of activations of the plurality of proximity sensors matches a gesture sequence, and control the latch mechanism in response to the plurality of activations of the plurality of proximity sensors matching the gesture sequence.

It is yet another aspect of the disclosure to provide a method of operating a touch and gesture pad to sense a gesture. The method begins by maintaining a controller unit in a stand-by state. The method continues with the step of periodically scanning for a change in capacitance from one of a plurality of capacitive sensors using the controller unit in the stand-by state. Next, determining whether a start sensor detects a touch or swipe. The method proceeds by returning to the stand-by state in response to not detecting the touch or swipe with the start sensor. The next step of the method is flagging the start sensor as a previously detected sensor in response to detecting the touch or swipe with the start sensor. The method continues with the step of determining whether a next sensor detects the touch or swipe. The method also includes the step of determining whether the next sensor detecting the touch or swipe follows the previously detected sensor in a gesture sequence. Then, returning to the stand-by state in response to the next sensor detecting the touch or swipe does not follow the previously detected sensor in the gesture sequence. The method continues by determining whether a last sensor of the gesture sequence been detected in response to the next sensor detecting the touch following to the previously detected sensor in the sequence. The method also includes the step of returning to the step of determining whether the next sensor detecting the touch or swipe follows the previously detected sensor in the gesture sequence in response to the last sensor of the sequence not being detected. Next, determining whether the gesture sequence is completed before a predetermined time elapses in response to the last sensor of the gesture sequence being detected. The method also includes the steps of returning to the stand-by state in response to the gesture sequence not being completed before the predetermined time elapses and registering the completion of the gesture sequence and commanding a control unit.

In accordance with another aspect, there is provided a touch pad for a vehicle applique providing access to a vehicle, the touch pad including a mechanical switch assembly provided behind an exterior surface of the applique, the mechanical switch assembly including a switch movable between a rest state and an activated state in response to a force input from a user on the exterior surface of the applique, and a controller unit coupled to the mechanical switch assembly and in communication with a latch mechanism and configured to detect an activation of the switch due to the force input, and control the latch mechanism in response to the activation of the switch. In accordance with a further aspect, the applique switch is movable between a rest state and an activated state in response to a force input from the applique.

In accordance with another aspect, there is provided a vehicle applique including a touch pad providing access to a vehicle, the touch pad including a mechanical switch assembly provided behind an exterior surface of the applique, the mechanical switch assembly including a switch movable between a rest state and an activated state in response to a force input from a user on the exterior surface of the vehicle applique, and a controller unit coupled to the mechanical switch assembly and in communication with a latch mechanism and configured to detect an activation of the switch due to the force input, and control the latch mechanism in response to the activation of the switch. In accordance with a further aspect, the applique includes a deflectable portion, the switch is positioned adjacent the deflectable portion, wherein the force input from the user causes the deflectable portion to deflect and activate the switch.

In accordance with another aspect, there is provided a method of operating a touch and gesture pad to sense a gesture, including the steps of maintaining a controller unit in a stand-by state, periodically scanning using the controller unit in the stand-by state for detection of an activation of one of at least one proximity sensor and a force based sensor, transitioning the controller unit from the stand-by state to an active state in response to detecting the activation, determining using the controller unit in the active state whether the activation of the other one of the at least one proximity sensor and the force based sensor is completed before a predetermined time elapses in response to detecting activation of the at least one proximity sensor and the force based sensor.

In accordance with another aspect, there is provided a backup power source to power the controller unit and the at least one proximity sensor in an event of a main vehicle battery not being available.

These and other aspects and areas of applicability will become apparent from the description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which:

FIGS. 1B and 10 are rear perspective side views of an applique for the motor vehicle of FIGS. 1 and 1A, according to aspects of the disclosure;

FIGS. 3A-3C illustrate the first exemplary embodiment of the touch and gesture pad in use to open or unlock with a circular motion according to aspects of the disclosure;

FIG. 6 illustrates a method of operating the first exemplary embodiment of the touch and gesture pad to sense a gesture according to aspects of the disclosure;

FIG. 7 is a block diagram generally depicting a second exemplary embodiment of the touch and gesture pad of the keyless entry system according to aspects of the disclosure;

FIGS. 8A-8E illustrate the second exemplary embodiment of the touch and gesture pad in use to open or unlock according to aspects of the disclosure;

FIGS. 9 and 10 illustrate cross-sectional views of a mechanical switch assembly of the second exemplary embodiment of the touch and gesture pad according to aspects of the disclosure;

FIGS. 9A and 10A illustrate cross-sectional views of a force based switch of the mechanical switch assembly of FIGS. 9 and 10, according to aspects of the disclosure;

FIG. 15 illustrates a method of operating the second exemplary embodiment of the touch and gesture pad to sense an input according to aspects of the disclosure; and FIG. 16 illustrates a method of operating another exemplary embodiment of the touch and gesture pad to sense an input according to aspects of the disclosure.

Corresponding reference numerals indicate corresponding parts throughout the various views of the drawings.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to a touch and gesture pad of the type well-suited for use in many applications. More specifically, a touch and gesture pad for a swipe/tap entry verification system and a method of operating the touch and gesture pad are disclosed herein. The touch and gesture pad for the swipe/tap entry verification system of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure.

Figure 1:
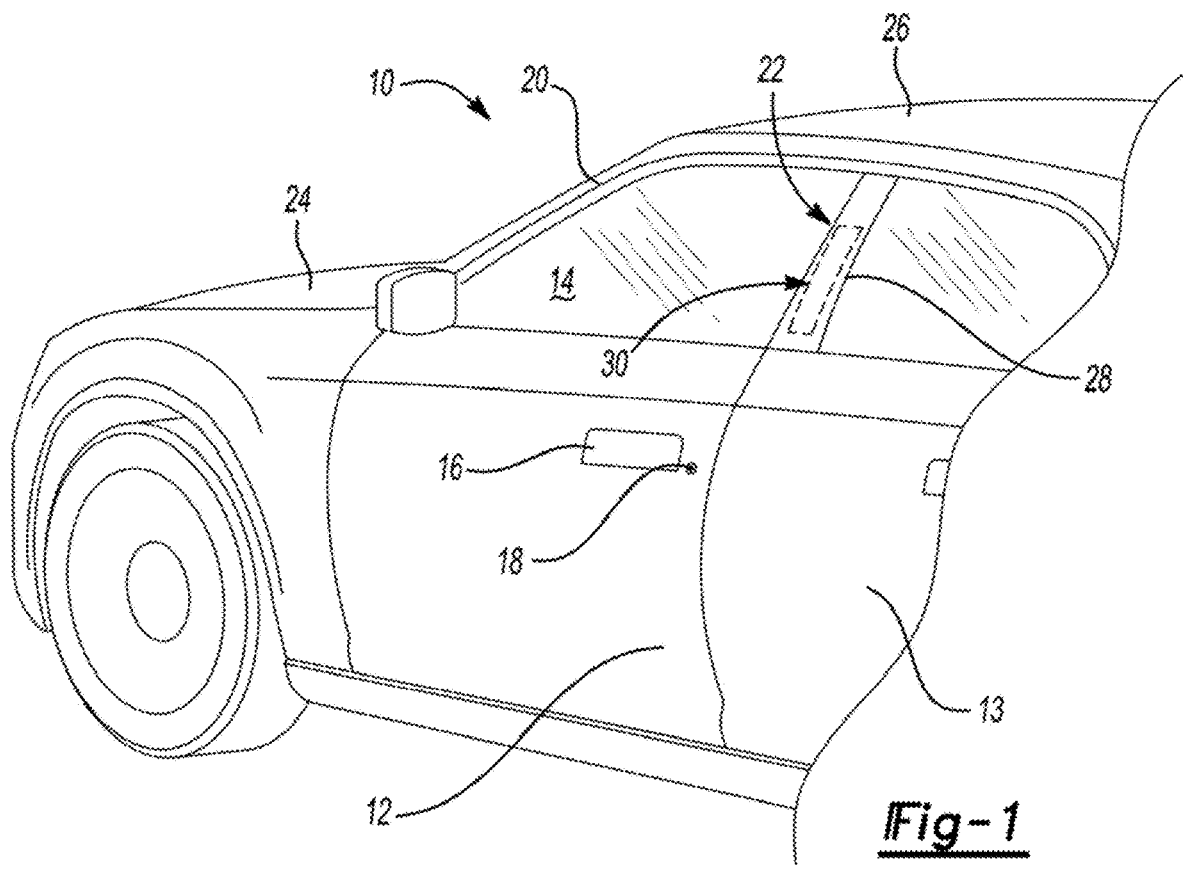
FIGS. 1 and 1A are partial perspective side views of a motor vehicle equipped with a keyless entry system according to aspects of the disclosure.

Referring to the Figures, wherein like numerals indicate corresponding parts throughout the several views, a side view of a motor vehicle 10 is shown partially cut away in FIG. 1 to include a driver-side front door 12 and a driver-side rear door 13 which both provide access to a passenger compartment 14. Front door 12 is shown to include a door handle 16 and a key hole 18 is provided for otherwise conventional locking and unlocking of a mechanically-activated latch mechanism (not shown) mounted within front door 12. Movement of the door handle 16 functions to release front door 12 for movement relative to body portion 24 when the latch mechanism is unlocked. A similar door handle (not shown) could be provided on rear door 13 and interconnected to another latch mechanism (not shown) provided for locking and unlocking rear door 13. A door handle may also not be provided as part of a handless door system. As will be detailed, each of the latch mechanisms may also include a power-operated actuator for controlling the locking and unlocking functions in association with a keyless or swipe/tap entry verification entry system, as well each of the latch mechanisms may also include a power-operated actuator for controlling the power releasing functions (e.g., controlling the release of a striker from a ratchet in a striker capture position, useful when a physical door handle 16 is not provided as part of a handless door system) and power cinching (e.g., controlling the cinching of a striker by a ratchet from a secondary striker capture position to a primary striker capture position) in association with a keyless or swipe/tap entry verification entry system as will be described in more detail below. Motor vehicle 10 is shown to also include an A-pillar 20, a B-pillar 22, and a roof portion 26.

In the example shown in FIG. 1, B-pillar 22 of the body portion 24 is covered by a cover plate assembly or applique 28. In the example shown in FIG. 1A, B-pillar frame portion 23 of front door 12 is covered by a cover plate assembly or applique 28. The applique 28 is formed illustratively from a polymer material such as plastic and mounted to the vehicle body 24 or door 12, 13. Other materials and combinations of materials may also be provided. The touch and gesture pad 30 associated with the keyless entry system of the present disclosure is mounted to B-pillar 22 within applique 28 (e.g., on a "dry side", or interior side, of the applique 28) at the location identified by the dashed lines. Touch and gesture pad 30 can be mounted between a structural portion of B-pillar 22 and applique 28. Specifically, the touch and gesture pad 30 may be attached to the applique 28 using adhesive, tape, or screws, for example. Illustratively fasteners 15 are shown. As an alternative, the touch and gesture pad 30 could be mounted to front door 12 in proximity to door handle 16 (not shown).

Figure 2:
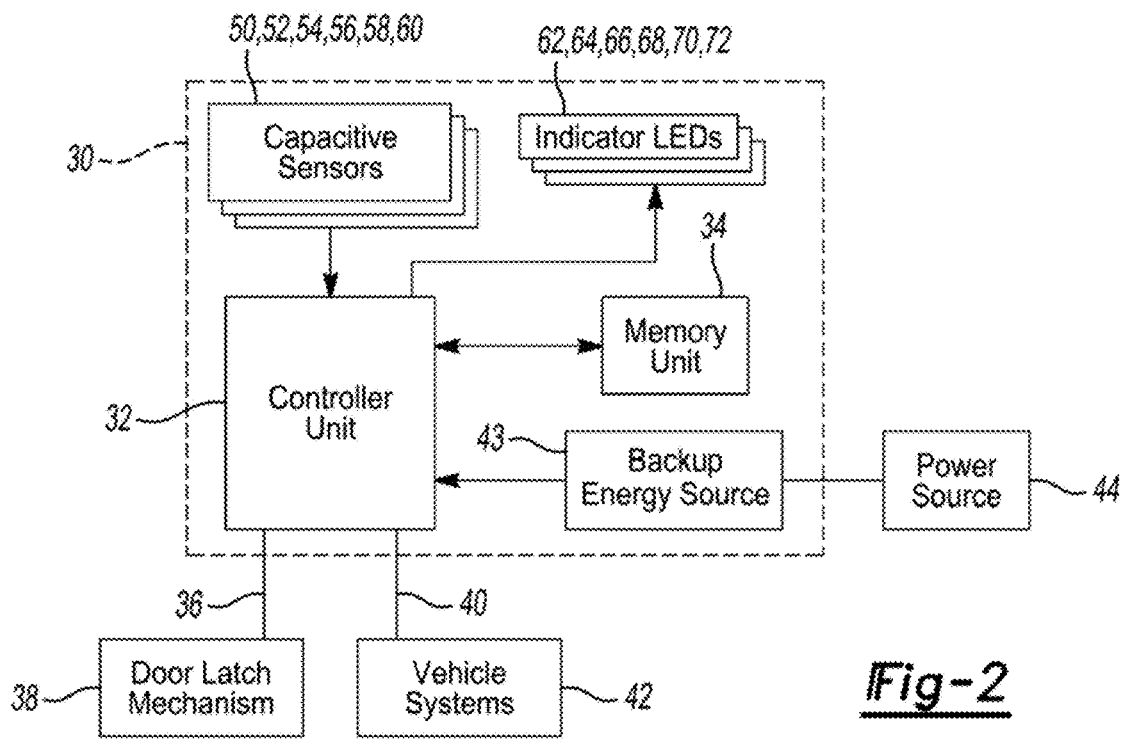
FIG. 2 is a block diagram generally depicting a first exemplary embodiment of a touch and gesture pad of the keyless entry system according to aspects of the disclosure.

Referring now to FIG. 2, a block diagram of various components of a first exemplary embodiment of a touch and gesture pad 30 of the keyless entry system is provided. As seen, touch and gesture pad 30 includes or is connected to a controller unit 32 configured to execute software code and/or instructions stored on a memory unit 34, such as an EEPROM or other type or memory device such as a solid state disk, RAM, hard disk or the like, and provides an electrical output along first line 36 to a power-operated actuator of a door latch mechanism 38, or to a latch controller unit for example local (e.g., integrated) to the door latch mechanism 38 for controlling the power-operated actuator of the door latch mechanism 38. Latch controller unit may also be installed in the door 12. As is known, controller unit 32 may also communicate with or control other vehicle systems 42 (i.e., power release of a trunk or lift gate, actuation of the lights and/or security functions, and activation of the ignition system and/or the vehicle's heating system, etc.), or communicate with a Body Control Module (BCM) known in the art as responsible for monitoring and controlling various to electronic accessories in the motor vehicle's 10 body, such as wireless access systems and devices (e.g., FOB, or PKE based systems) and authentication systems and other control other vehicle systems 42, along second lines 40. A backup energy source 43 (e.g., super capacitors, or a battery) can store and provide power to controller unit 32 in the event that a power source 44, such as a main vehicle battery, cannot provide power, such as would occur during an emergency crash condition, an interruption to a power supply line supplying power to the controller unit 32, or in the event of a depleted battery 44, or the like events. However, the power source 44 may normally provide power to controller unit 32.

In operation, the touch and gesture pad 30 is configured to permit selective access to passenger compartment 14 via front door 12 or, in the alternative, both doors 12, 13 when the operator (hereinafter, the "user") enters an authorization code via touch and gesture pad 30. The authentication code entered is transmitted to controller unit 32 where it is compared to a correct or verification code stored in a memory. The controller unit 32 may otherwise or also communicate with the other vehicle systems 42 to transmit the entered authentication code for comparison by the vehicle systems 42 (e.g., a vehicle authentication system or the Body Control Module) with the correct or verification code stored in a memory of the vehicle systems 42, or retrieve the correct or verification code from the vehicle systems 42 for comparison by the controller unit 32. The controller unit 32 may otherwise or also communicate directly with the door latch mechanism 38 for the like purposes of validating the authentication code with the correct or verification code (e.g., the door latch mechanism 38 receives the entered authentication code and communicates with the vehicle systems 42 for comparison). If the entered passcode matches the verification code stored in the memory unit 34, a signal is sent to latch mechanism 38 and permit operation of door handle 16 to release front door 12 (or both doors 12, 13) and allow access to passenger compartment 14. Alternatively, if the entered passcode matches the verification code stored in the memory unit 34, a signal is sent to latch mechanism 38 to command operation of the actuator to unlock the latch mechanism 38 and/or power release the latch mechanism 38 to release front door 12 (or both doors 12, 13) and allow access to passenger compartment 14. Alternatively, if the entered passcode matches the verification code stored in the memory unit 34, a signal is sent to latch mechanism 38 to command operation of the actuator to lock the latch mechanism 38, or perform other operations, such as lock all other latch mechanisms 38 of both doors 12, 13. Such a command operation may also include communication with a BCM or other vehicle systems 42. Those skilled in the art will recognize that this rudimentary control diagram shown in FIG. 2 is merely an example of only one suitable arrangement for the keyless entry system.

The touch and gesture pad 30 defines a user-input touch interface adapted to sense user inputs, such as a touch (i.e., tap) or a gesture (e.g., a sequenced motion, or patterned swipe), which may be illustratively continuous that is performed as a single gestured motion, as compared to a discontinuous gesture associated with known numbered keypads in the art. The touch and gesture pad 30 can include a housing 29 and a cover (e.g., clear acrylic) attached to the housing 29 to define a compartment 31. In one illustrative embodiment, the cover is formed from a portion, such as a recessed portion 33, of the applique 28 (see FIGS. 9A and 10A), which may be configured to be transparent or semi-transparent for allowing light 35 to transmit through the applique 28 as will be described in more detail herein below. Alternatively, an aperture or port 261 (see FIGS. 9 and 10) in the applique 28 may be formed for receiving the cover and/or a portion of the housing 29, or the cover may be positioned adjacent the inner surface 27 (e.g., dry side) of the applique 28. The cover has a top side and a bottom side and the area defines a plurality of selectable regions. The selectable regions are not printed with ink and may be left clear, or printed in another color. The touch and gesture pad 30 also includes a wiring connector 37 for attachment to a wiring harness to provide electrical power (e.g., from power source 44) and communication with the other vehicle systems 42. It should be appreciated that numerous different materials and/or configurations may be utilized for the touch and gesture pad 30.

The touch and gesture pad 30 can include a PCB (printed circuit board) 39 in electrical connection with the wiring connector 37 and disposed in the compartment 31 of the housing 29. The PCB 39 can support the controller unit 32 and the electronic components associated with the controller unit 32, for example. It is recognized that the housing 29 may be configured as a single housing (see FIG. 1B), or as multiple housings $29_1$, $29_2$ (see FIG. C). Illustratively, the second housing $29_2$ may house the backup power source 43, while the first housing $29_1$ houses the PCB 39 and proximity sensors. Illustratively, one single housing 29 may house the backup power source 43, and the PCB 39 and proximity sensors.

A plurality of capacitive sensors 50, 52, 54, 56, 58, 60 (e.g. generally referred to as proximity sensors 49) are disposed on, illustratively as electrodes 252, and electrically connected to the PCB 39, or each of the sensors may be dispersed on individual PCBs within the housing 29, $29_1$, $29_2$, for sensing one of a gesture and a touch to the touch and gesture assembly 30. The plurality of capacitive sensors 50, 52, 54, 56, 58, 60 are each coupled to and monitored by the controller unit 32 to indicate one of the touch and the gesture. While the touch and gesture assembly 30 is illustrated herein with reference to capacitive sensors, other types of proximity sensors may be provided, such as radar sensors, light sensors, or ultrasonic sensors, capable of detecting a touch of the applique 28, for example by a finger 33, palm or hand, or a swipe of or a swipe above the exterior surface 41 of the applique 28, or a hoover above the applique 28, or a proximate positioning of the finger(s) 33 or hand above or on the exterior surface 41 of the applique 28. Specifically, the plurality of capacitive sensors 50, 52, 54, 56, 58, 60 can communicate with the controller unit 32 via an 120 bus, for example, which may be illustratively defined by traces etched on the PCB 39. So the controller unit 32 is coupled to the plurality of capacitive sensors 50, 52, 54, 56, 58, 60 and is optionally in communication with at least one of the plurality of vehicle systems 42 and the latch mechanism 38 and is configured to detect a plurality of changes in capacitance of the plurality of capacitive sensors 50, 52, 54, 56, 58, 60 (e.g., activations of the proximity sensors 49) due to the touch and/or gesture input and determine whether the plurality of changes in capacitance matches a gesture sequence within a predetermined amount of time. The controller unit 32 is also configured to control the latch mechanism 38 (e.g., issue a command request to control a power actuator of the latch mechanism 38) in response to communication with the plurality of vehicle systems 42 (e.g., communicate with a Body Control Module or keyless entry module to confirm that the key fob is detected, or communicate with a Body Control Module to confirm the verification code), and in response to the plurality of changes in capacitance (e.g. activations) matching the gesture sequence within the predetermined amount of time. In an alternative, controller unit 32 may also be configured to detect a sequence or pattern of activations of the proximity sensors 49 (e.g., changes in capacitances) in the configuration of a plurality of capacitive sensors 50, 52, 54, 56, 58, 60, in such a case, the controller unit 32 may not need to rely on communication with the plurality of vehicle controllers 42 before controlling the latch mechanism 38 (e.g., since the authenticated gesture sequence detected by the plurality of capacitive sensors 50, 52, 54, 56, 58, 60 provides identity confirmation ("something you know") such that there would not be a need to confirm that a key fob 101 providing identify and authentication information is detected beforehand ("something you have") by an authentication/security system.

Figure 4A:
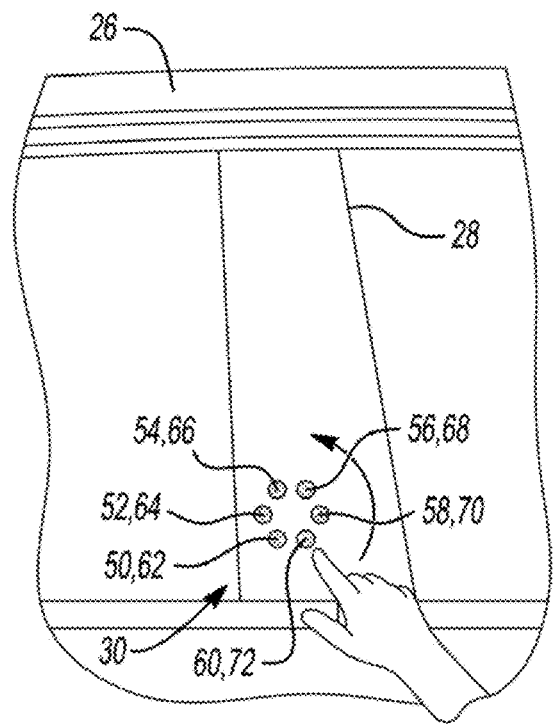
FIGS. 4A-4C illustrate the first exemplary embodiment of the touch and gesture pad in use to lock with a circular motion according to aspects of the disclosure.
Figure 4B:
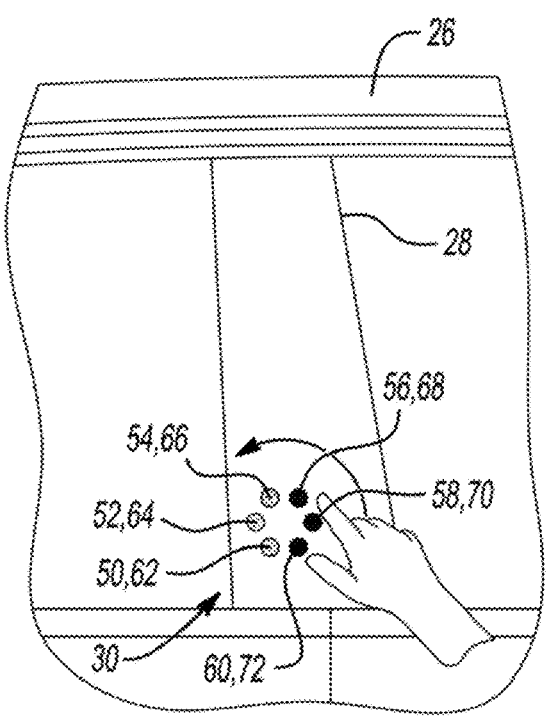
Figure 4C:
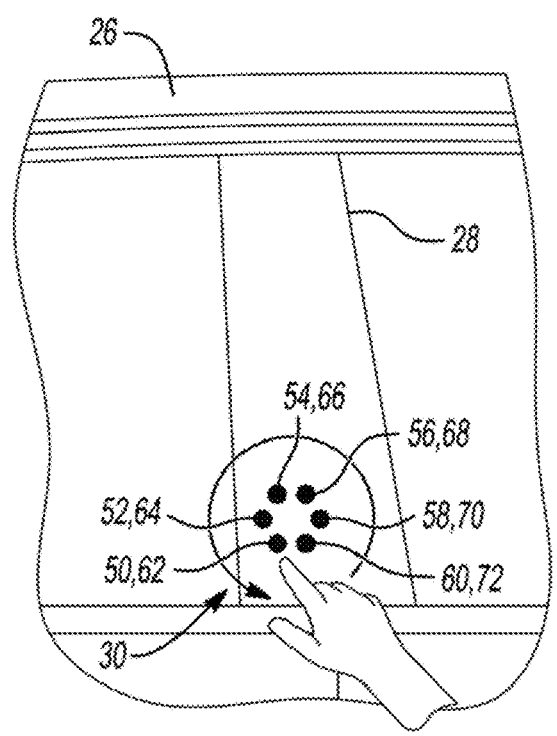
Figure 5A:
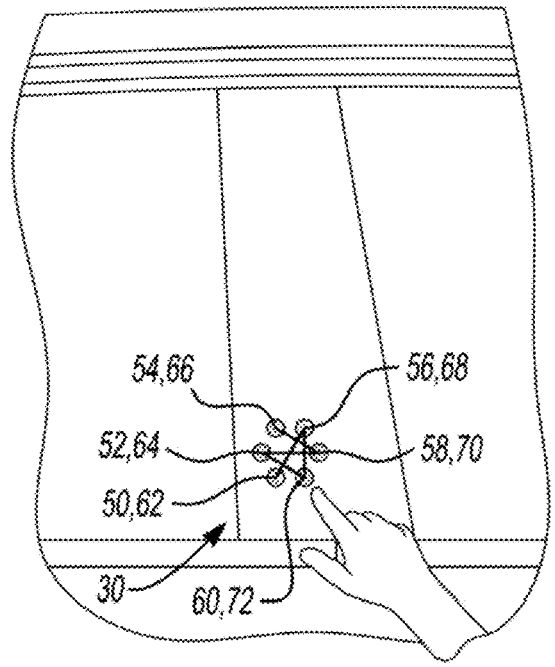
FIGS. 5A-5D illustrate the first exemplary embodiment of the touch and gesture pad in use to open or unlock with a predetermined non-linear pattern according to aspects of the disclosure.
Figure 5B:
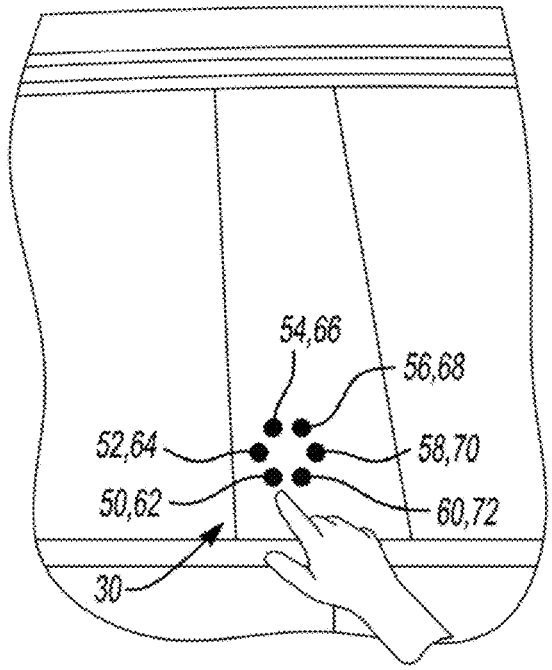

As best shown in FIGS. 3A-5B, the plurality of capacitive sensors 50, 52, 54, 56, 58, 60 include a first capacitive sensor 50 and a second capacitive sensor 52 and a third capacitive sensor 54 and a fourth capacitive sensor 56 and a fifth capacitive sensor 58 and a sixth capacitive sensor 60. The plurality of capacitive sensors 50, 52, 54, 56, 58, 60 are spaced from one another in a non-linear arrangement, for example the plurality of capacitive sensors 50, 52, 54, 56, 58, 60 are circumferentially spaced from one another in a circular arrangement with each defining a sensor node (corresponding with a selectable region) for receiving a touch input from a user in the form of a touch or a swipe. In accordance with another embodiment, and with reference to FIGS. 5C and 5D, the plurality of capacitive sensors include a first capacitive sensor 50' and a second capacitive sensor 52' and a third capacitive sensor 54' and a fourth capacitive sensor 56'. The plurality of capacitive sensors 50', 52', 54', 56', are circumferentially spaced from one another in a semi-circular arrangement with each defining a sensor or touch node (corresponding with a selectable region) for receiving a input from a user in the form of a touch or a swipe. In FIGS. 3A to 4C, a non-linear swipe, such as a circular swipe is illustrated. In FIGS. 5C and 5D, a semi-circular nonlinear swipe is illustrated. In FIGS. 5A and 5B, a non-linear swipe pattern is illustrated.

A plurality of indicator LEDs 62, 64, 66, 68, 70, 72 (light emitting diodes) are disposed on the PCB 39 and electrically connected to the controller unit 32 for illuminating the plurality of sensor nodes. Each of plurality of indicator LEDs 62, 64, 66, 68, 70, 72 is adjacent to an associated one of the plurality of capacitive sensors 50, 52, 54, 56, 58, 60. Specifically, a first indictor LED 62 is adjacent to the first capacitive sensor 50 and a second indicator LED 64 is adjacent to the second capacitive sensor 52 and a third indicator LED 66 is adjacent to the third capacitive sensor 54 and a fourth indicator LED 68 is adjacent to the fourth capacitive sensor 56 and a fifth indicator LED 70 is adjacent to the fifth capacitive sensor 58 and a sixth indicator LED 72 is adjacent to the sixth capacitive sensor 60 for illuminating the plurality of sensor nodes. The controller unit 32 is additionally configured to alter the illumination of each of the plurality of indicator light emitting diodes 62, 64, 66, 68, 70, 72 in response to each of the plurality of changes in capacitance being attributed to a corresponding each one of the plurality of capacitive sensors 50, 52, 54, 56, 58, 60. The controller unit 32 is additionally configured to supply power for the illumination of each of the plurality of indicator light emitting diodes 62, 64, 66, 68, 70, 72, from either the main vehicle power source 44 or the backup energy source 43. A similar configuration is applicable for each of the plurality of indicator LEDs 62', 64', 66', 68' provided adjacent to one of the plurality of capacitive sensors 50', 52', 54', 56' illustrated in FIGS. 5C and 5D.

According to an aspect, the door latch mechanism 38 may utilize one or more backup power units (e.g., a local super-capacitor, or a battery) to allow its operation in the event that the power source 44 is not available (e.g., in an emergency). However, the plurality of capacitive sensors 50, 52, 54, 56, 58, 60 also require electrical power and would not otherwise be able to detect the one of the touch and the gesture in the event that the power source 44 is not available. Thus, the use of the backup energy source 43 described above is advantageous and can provide power to the controller unit 32 and the plurality of capacitive sensors 50, 52, 54, 56, 58, 60, as well as the plurality of indicator light emitting diodes 62, 64, 66, 68, 70, 72, if the power source 44 is not available.

A method of operating a touch and gesture pad 30 to sense a gesture is disclosed. For example, this gesture sensing could be used to lock or unlock, or power release, the latch mechanism 38 to allow the door 12, 13 to open if the user has a key fob 101 in detection proximity to the motor vehicle 10 (e.g., in his or her pocket) and the user does not want to reach into their pocket and press the lock or unlock button on the key fob 101. For example, this gesture sensing could also be used to lock or unlock, or power release, the latch mechanism 38 to allow the door 12, 13 to open if the user does not possess a key fob 101 nearby the motor vehicle 10.

As illustrated more specifically in FIG. 6, the method of operating a touch and gesture pad 30 to sense a gesture begins with the step of 100 maintaining a controller unit 32 in a stand-by state. Next, 102 periodically scanning for a change in capacitance (e.g. activation) from one of a plurality of capacitive sensors (e.g., the first capacitive sensor 50 and the second capacitive sensor 52 and the third capacitive sensor 54 and the fourth capacitive sensor 56 and the fifth capacitive sensor 58 and the sixth capacitive sensor 60) using the controller unit 32 in the stand-by state. In more detail, the capacitive sensors 50, 52, 54, 56, 58, 60 can be monitored via the 120 bus by the controller unit 32 every 1 millisecond, for example. However, other monitoring rates may also be implemented. Then, 106 determining whether a start sensor (e.g., the first capacitive sensor 50) detects a touch or swipe. The method continues with the step of 108 returning to the stand-by state in response to not detecting the touch or swipe with the start sensor. The method also includes the steps of 109 checking a start time over sensor ($TOS_S$) (i.e., an amount of time over the start sensor) and 110 flagging the start sensor as a previously detected sensor in response to detecting the touch or swipe with the start sensor and 112 altering the illumination of a start indicator light emitting diode (e.g., first light emitting diode 62) in response to detecting the touch or swipe with the start sensor. The altering of the illumination could be from one color to another (e.g., blue to green) or just turning the indicator LED 62, 64, 66, 68, 70, 72 on from an off state. Alternatively, the color of the indicator LED 62, 64, 66, 68, 70, 72 could also indicate an error (e.g., the wrong start sensor being touched).

The method of operating the touch and gesture pad 30 to sense the gesture includes the step of 114 determining whether a next sensor (i.e., another of the plurality of capacitive sensors 50, 52, 54, 56, 58, 60 besides the start sensor) detects the touch or swipe and 116 determining whether the next sensor detecting the touch follows the previously detected sensor in a gesture sequence. The next step of the method is 118 returning to the stand-by state in response to the next sensor detecting that the touch or swipe does not follow the previously detected sensor in the gesture sequence. The method continues with the steps of 119 checking a next time over sensor ($TOS_n$) (i.e., an amount of time over the next sensor) and a time between the previously detected sensor and the next sensor or time between sensors (TBS) (i.e., an amount of time for the user to move his or her finger 33 from the start sensor to the next sensor or between each of the plurality of capacitive sensors 50, 52, 54, 56, 58, 60 in the gesture sequence). Swiping between each of the plurality of capacitive sensors 50, 52, 54, 56, 58, 60 on time or according to predetermined start time over sensor ($TOS_s$), next time over sensor ($TOS_n$), and time between sensors (TBS), can result in improved reduction of false commands due to rain/washing conditions, for example, making the touch and gesture pad 30 more suitable for implementing door release commands. Thus, finger passage over the plurality of capacitive sensors 50, 52, 54, 56, 58, 60 is preferably according to a programmed timing. The values of the start time over sensor ($TOS_s$), next time over sensor ($TOS_n$), and time between sensors (TBS) are programmable/settable (e.g., ⅙ of a second), like the gesture sequence, to filter accidental activations to the touch and gesture pad 30.

The method can continue by 120 flagging the next sensor as a previously detected sensor and 122 altering the illumination of a next indicator light emitting diode 62, 64, 66, 68, 70, 72 corresponding to the next sensor in response to the next sensor detecting the touch or swipe.

In other words, the illumination of each of the plurality of indicator light emitting diodes 62, 64, 66, 68, 70, 72 is altered in response to each of the plurality of changes in capacitance being attributed to a corresponding each one of the plurality of capacitive sensors 50, 52, 54, 56, 58, 60. Again, the altering of the illumination could be from one color to another (e.g., blue to green) or just turning the indicator LED 62, 64, 66, 68, 70, 72 on from an off state. Alternatively, the color of the indicator LED 62, 64, 66, 68, 70, 72 could also indicate an error (e.g., the wrong next sensor being touched), such as the color red.

Figure 1A:
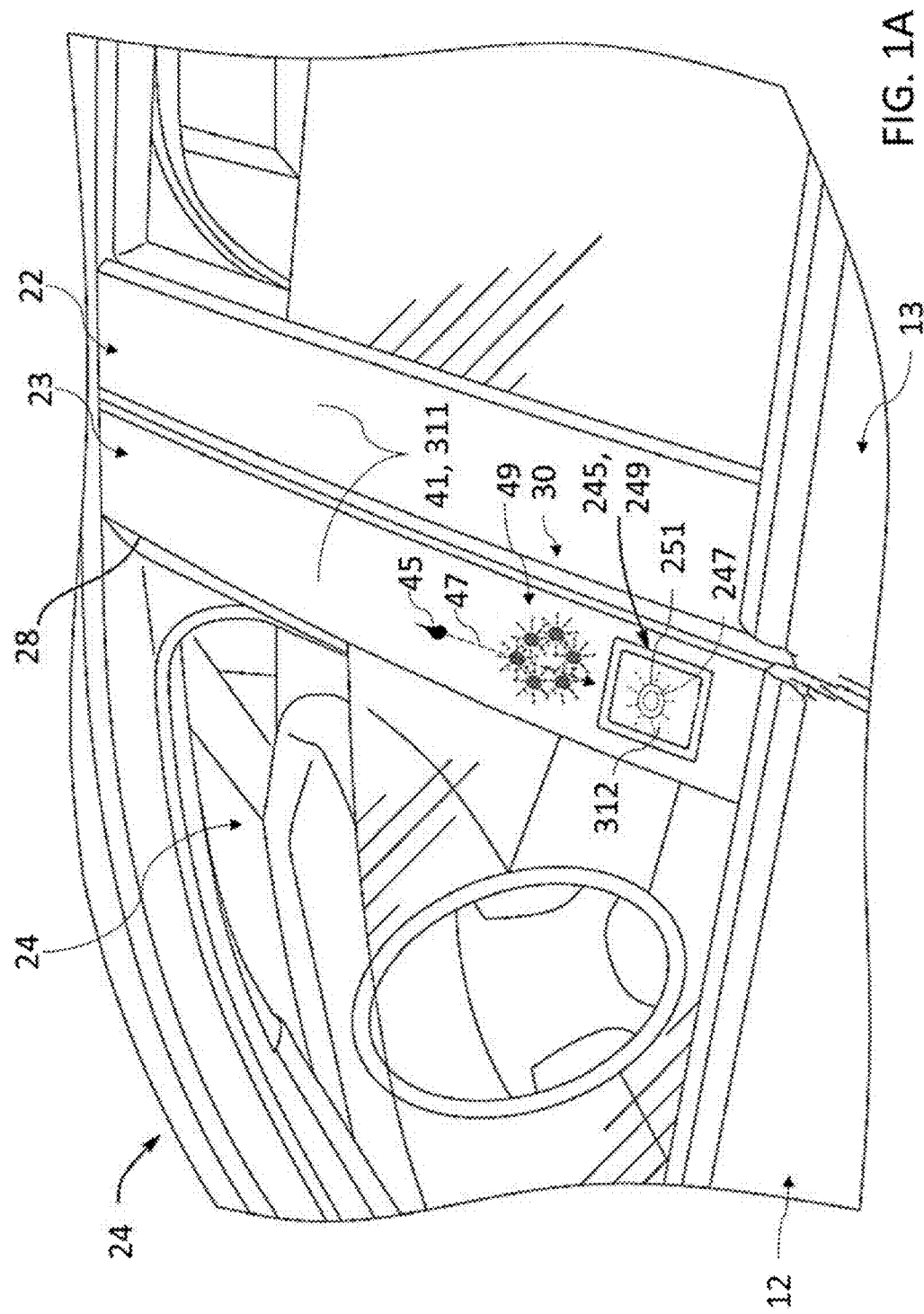
Figure 1C:
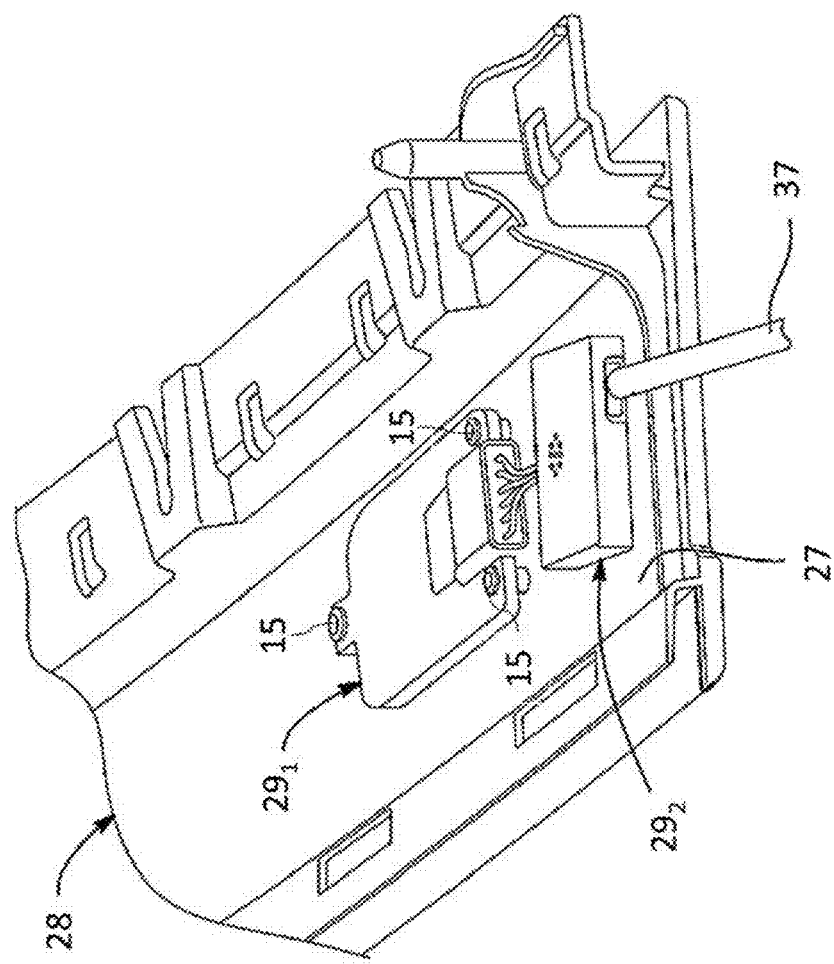
Figure 1B:
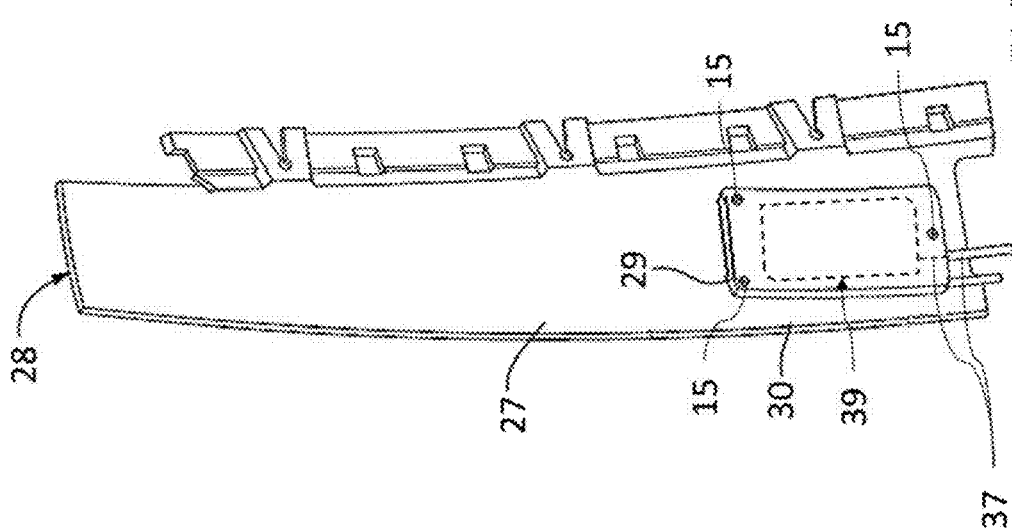
Figure 5D:
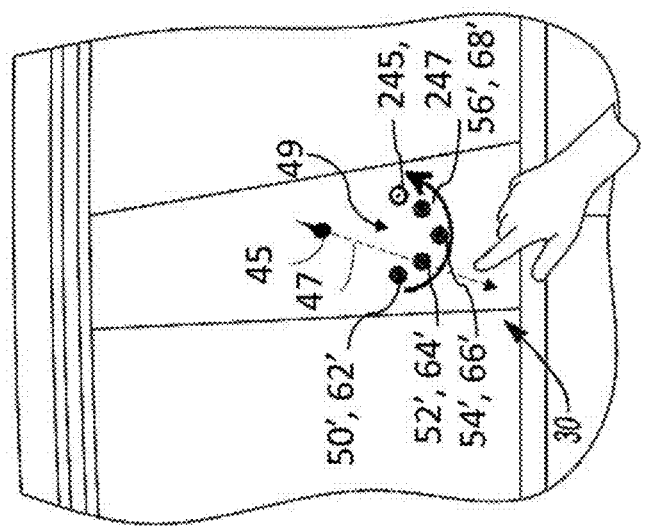
Figure 5C:
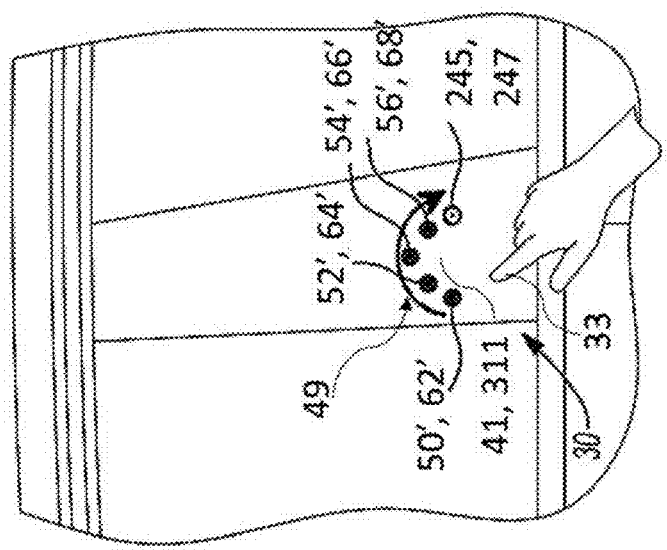

The method of operating the touch and gesture pad 30 to sense the gesture continues with the step of 122 determining whether a last sensor of the gesture sequence been detected in response to the next sensor detecting the touch following to the previously detected sensor in the sequence. Next, 124 returning to the step of determining whether the next sensor detecting the touch or swipe follows the previously detected sensor in the gesture sequence. The method continues by 126 determining whether the gesture sequence is completed before a predetermined time elapses in response to the last sensor of the gesture sequence being detected. Then, 128 returning to the stand-by state in response to the gesture sequence not being completed before the predetermined time elapses. The method concludes with the step of 130 registering the completion of the gesture sequence and commanding a control unit (e.g., latch mechanism 38), if the gesture sequence is completed before the predetermined time elapses (e.g., less than 1 second). For example, the gesture sequence could be a circular motion (in one direction to unlock or open as shown in FIGS. 3A-3C and in the opposite direction as shown in FIGS. 4A-4C to lock or close). The gesture sequence could alternatively be a predetermined pattern or sequence between the plurality of capacitive sensors 50, 52, 54, 56, 58, 60, as shown in FIGS. 5A-5B to unlock or open. For example, the gesture sequence could be a semi-circular motion (in one direction to unlock or open as shown in FIGS. 5C-5D and in the opposite direction to lock or close). Providing such a non-linear arrangement of sensors for detecting a non-linear gesture sequence, such as a non-linear swipe in a circular or semi-circular arrangement as examples, can avoid false activations of the sensors. Due to the trajectory of water generally travelling in a linear direction as shown in FIG. 1A, with minimal deviations from its linear trajectory to a non-linear trajectory, nor experiencing any significant directional changes (e.g., a 180 degree directional change), false activation of a plurality of sensors provided in a non-linear arrangement is achieved since activation of all the sensors in a sequence due to a linear trajectory (e.g. a straight line) of rain or water is highly unlikely. In an embodiment, the sensors 49 may be arranged such that there is no overlapping sensor 49 (e.g., a sensor above or below another sensor) along a linear path, such as a line defined from a top portion of the applique 28 to a bottom portion of the applique 28. For example, water, such as rain 45 travelling vertically or substantially vertically from the top of the applique 28 towards the bottom of the applique 28 due to gravity during rainfall, or water travelling in a generally linear direction illustrated as arrow 47, such as horizontally, which would occur during a car washing scenario causing water to be propelled in one direction would not activate a sequence of sensors provided in a non-linear arrangement within a time period of each previous activation required for locking/opening the latch mechanism 38.

Referring now to FIG. 7, a block diagram of various components of a second exemplary embodiment of the touch and gesture pad 230 is provided. As with the first exemplary embodiment of the touch and gesture assembly 30, touch and gesture assembly 230 includes or is connected to a controller unit 232 configured to execute software code and/or instructions stored on a memory unit 234 and provides an electrical output along first line 236 to a power-operated actuator of a door latch mechanism 238. The controller unit 232 may also provide electrical outputs along second lines 240 for communicating with and controlling other vehicle systems 242 (i.e., power release of a trunk or lift gate, actuation of the lights and/or security functions, and activation of the ignition system and/or the vehicle's heating system, etc., either directly or by communication with the Body Control Module). A power source 244, such as a battery (e.g., a vehicle main battery), may provide power to controller unit 232. A backup energy source 243 (e.g., super capacitors, battery) can store and provide power to the controller unit 232, as well as to the indicator light emitting diodes 249 (e.g. LEDs 62, 64, 66, 68, 70, 72) and proximity sensors 250 (e.g. plurality of capacitive sensors 50, 52, 54, 56, 58, 60) in the event that the power source 244 cannot provide power.

As best shown in FIGS. 8A to 13, the second exemplary embodiment of the touch and gesture pad 230 also includes a mechanical switch assembly 245 including a switch 247 whose properties are modifiable in response to a force input, such as from a user or by a portion of the applique 28 as will be described herein. In one embodiment, the switch 247 is movable between a rest position and a displaced position in response to a force input from a user to modify the state of the switch 247. The mechanical switch assembly 245 includes a capacitive sensor 250 that defines a sensor node for receiving a touch input from the user. The controller unit 232 is coupled to the mechanical switch assembly 245 and capacitive sensor 250 and is configured to detect a change in capacitance of the capacitive sensor 250 due to the touch input and detect movement of the switch 247 of the mechanical switch assembly 245 to the displaced position, or activated position, due to the force input. While the switch 247 is shown as a normally open switch, a resistive sensor with very high resistance (e.g., 1 megaohm) could alternatively be utilized.

With reference to FIGS. 9A and 10A-10D, there is illustrated another embodiment of touch and gesture pad 230 including a mechanical switch assembly 245 including a force based switch 247 or sensor modifiable between a deactivate state and at least one activated state in response to a force input applied to the class-A surface 311 of the applique 28, with the class-A surface 311 presenting a smooth and uninterrupted surface in a region around the force-based switch 247. For example, the force based switch 247 may include a movable upper actuation plate 249 (e.g. relative to another lower actuation plate 251 defining a gap $G_1$ therebetween the plates 249, 251 for forming a capacitor configuration), the movable upper actuation plate 249 moveable between a rest position and a displaced position, or activated position, illustratively towards the lower actuation plate 251 in response to a force input F from a user (e.g., finger 33) applied to the class-A surface 311 of the applique 28 to thereby modify the gap $G_1$ to a smaller gap $G_2$ and as a result alter the capacitance of the force based switch 247 in proportion to the force applied to the plates 249, 251. An illustrative example of a force based switch is provided with reference to U.S. Pat. No. 9,349,552, the entirety of which is incorporated herein by reference. Other types of force based sensors or switches, may however be provided. The change in the capacitance circuit defined by the plates 249, 251 and the dielectric material 253 disposed between the plates 249, 251 corresponds with the force applied by the user's finger 33 to class-A surface 311 of the applique 28 and transferred to the upper actuation plate 249. This change in capacitance is detected by the controller unit 232 which is configured, to determine the level of force applied to the force-based switch 247 which may be proportional to the change in the detected capacitance. While the force-based switch 247 has been described as a device that experiences a change in capacitance in response to application of a force, it may also be configured to detect other changes in an electrical property which are modified, such as an increase in conductance, in response to application of a physical force. The force-based switch 247 is connected to the controller unit 232 configured to execute software code and/or instructions stored on a memory unit 234 for interpreting signals from the force-based switch 247 (e.g. voltage changes or capacitive changes) and provides an electrical output along first line 236 to a power-operated actuator of a door latch mechanism 38. Various continuous levels of forces (e.g., capacitance changes) can be detected and processed by the controller unit 232. Different vehicle functions can be commanded by the controller unit 232 based on the level of force applied.

With reference to FIGS. 7, 8D, 9A, and 10A-10D, in accordance with an illustrative embodiment, a vehicle applique 28 is provided and includes a touch and gesture pad 230 providing access to a vehicle 10, the touch and gesture pad 230 comprising a mechanical switch assembly 245 (illustrated in FIG. 8D in ghosted outline) provided behind an exterior surface 41, 311 of the vehicle applique 28, the mechanical switch assembly 245 including a switch (e.g., force based switch 247) modifiable between a rest state and an activated state in response to a force input from a user on the exterior surface 41, 311 of the applique 28, and a controller unit 232 coupled to said a mechanical switch assembly 245 and in communication with a latch mechanism 38 and configured to detect an activation of the switch 247 due to the force input, and control the latch mechanism 38 in response the activation of the switch 247. The applique 28 may include a deflectable portion, the switch is positioned adjacent the deflectable portion 301, wherein the force input from the user causes the deflectable portion 301 to deflect and activate the switch 247.

The class-A surface 311 of the applique 28 is a physical surface that is intended to be directly viewed and/or touched by users of the motor vehicle 10. As illustrated in FIGS. 1 and 1A, the class-A surface 311 presents a smooth and uninterrupted surface at least in a touch-sensitive region 312 around the force-based switch 247. As shown in the cut-away view of FIGS. 9A and 10A, the touch-sensitive region 312 of the applique 28 may be configured to deflect and/or to deform in response to a force applied thereto, for example, by being pushed by a user's fingertip 33. A zone of weakness in the applique 28 defined by the recess 31 may allow for such deflection. Alternatively, the thickness of the applique 28 may provide for an intrinsic deformation due to the manufactured thinness of the applique 28. Other manners of transferring the force F to the switch 247 through the applique 28 may be provided. For example, the applique 28 may be variably suspended from the vehicle door 12 or body 24, such that the force F input moves the applique 28 into engagement with the switch 247. As a result of the movement, deformation, deflection or flexing of the touch-sensitive region 312, the force-based switch force based switch 247 (e.g. an upper plate 249) disposed beneath the exterior surface 41 may register the touch by the contact of the deflected or deformed touch-sensitive region 312, in particular by the inner surface 27 of applique 28 with the upper plate 249 illustrated in enlarged area A in FIGS. 100 and 10D. Force-based switch 247 provides several advantages over other types of switches, such as capacitive switches, for rejecting false activations caused by rain or water. Additionally, force-based switches 247 may be actuated by a gloved hand. A force-based switch 247, instead, relies on mechanical pressure to eliminate accidental activation which cannot be achieved by rain or water engaging with the exterior surface 41. Employing the force-based switch 247 behind the uninterrupted class-A surface 311 of the applique 28 further provides several advantages over the prior art arrangement with an aperture for receiving a mechanical switch. It provides a smoother and more attractive appearance, it may be more resilient and resistant to the elements, such as precipitation and rain. It may also be easier and/or less expensive to manufacture, as the force-based switch 247 is protected by the applique 28, so it does not need to withstand exposure to the elements, such as water or sunlight.

Figure 8E:
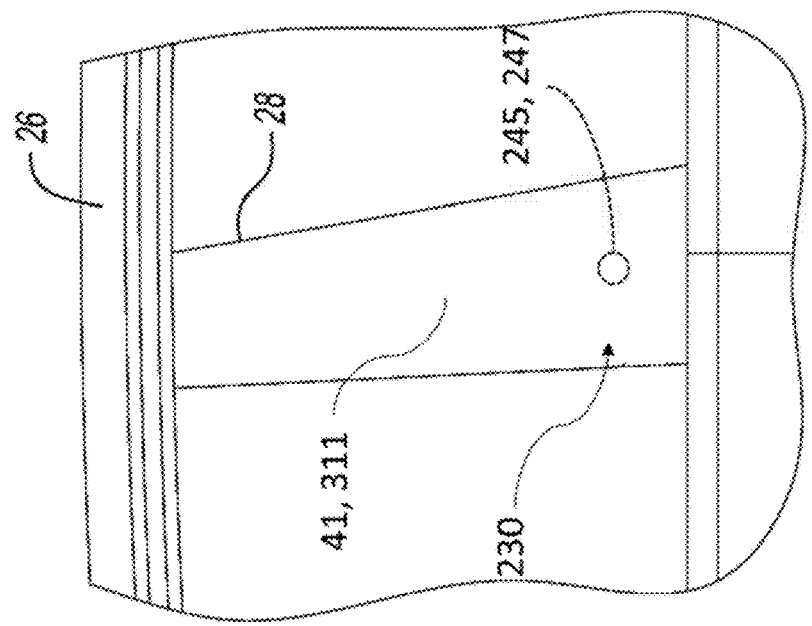

The controller unit 232 is also configured to determine whether the change in capacitance of a single capacitive sensor 250 and movement of the mechanical switch assembly 245 occurs within a predetermined amount of time and control the latch mechanism 238, and optionally in response to communication with the plurality of vehicle systems 242 (e.g., communicate with a Body Control Module or keyless entry module to confirm that the key fob is detected) and in response to the change in capacitance and movement of the switch 247 of the mechanical switch 245 occurring within the predetermined amount of time. The change of capacitance may indicate a touch or a hovering of a finger over the capacitive sensor 250, however, the capacitive sensor 250 may also be configured to detect a fingerprint ("something you are"), in such a case, the controller unit 232 may not need to rely on communication with the plurality of vehicle controllers 242 before controlling the latch mechanism 238 (e.g., because a fingerprint is detected, there would not be a need to confirm that a key fob is detected). Capacitive sensor 250 and mechanical switch assembly 245 which are shown in FIG. 8A as being provided as an integral unit, may be provided as separate units mounted to the applique 28. For example, capacitive sensor 250 may be associated with indicator light emitting diode 249 of FIG. 8B, with light emitting diode 249 configured to illuminate an icon, such as a lock symbol.

Figure 11:
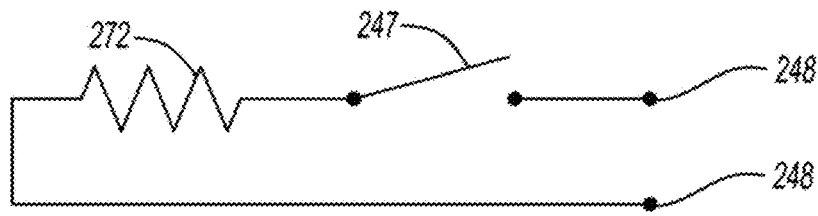
FIGS. 11-13 illustrate multiple alternative circuit diagrams of the mechanical switch assembly according to aspects of the disclosure.
Figure 12:
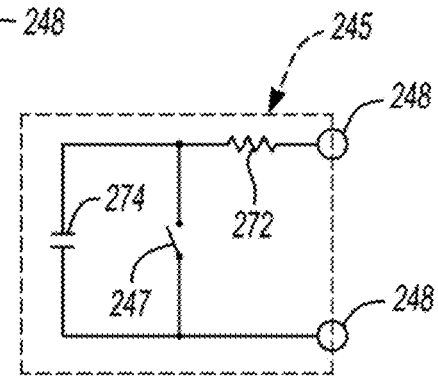
Figure 13:
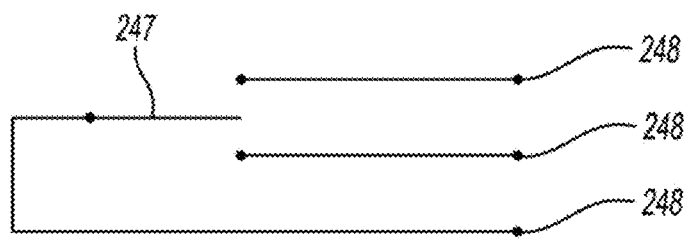

With reference to FIGS. 11 to 13, the mechanical switch assembly 245 includes a plurality of pins 248 electrically coupled to the controller unit 232 and to the switch 247. While the plurality of pins 248 of the mechanical switch assembly 245 include two pins 248 each electrically coupled to the controller unit 232, other configurations of the switch 247 and pins 248 are possible.

The second exemplary embodiment of the touch and gesture pad 230 also includes at least one indicator light emitting diode 249 coupled to the controller unit 232 to provide an indication of the operation of at least one of the capacitive sensor 250 and the switch 247 of the mechanical switch assembly 245. The at least one indicator light emitting diode 249 can be disposed adjacent to the mechanical switch assembly 245 (e.g., above) and/or may be arranged or integrated with the mechanical switch assembly 245 to provide a lighted ring 251 surrounding the mechanical switch assembly 245. Thus, the controller unit 232 is further configured to alter the illumination of the at least one indicator light emitting diode 249 in response to at least one of the change in state or property, such as a change in capacitance and movement of the switch 247 of the mechanical switch assembly 245.

The controller unit 232 may also be configured to illuminate an at least one indicator light emitting diode 249 associated with the switch 247, for example as disposed on the common PCB 39 of the switch 247 as shown in FIGS. 9A and 10A, to indicate the location of the sensor node associated with the switch 247 positioned behind the applique 28 for informing a user where to depress the class-A surface 311 of the applique 28. Light emitted by the at least one indicator light emitting diode 249 is transmitted through the applique 28. In such a configuration as illustrated in FIG. 8A for example, the single capacitive sensor 250 is configured to detect a general activation intent by a generally delocalized swipe over the applique 28, while the mechanical switch assembly 245 is subsequently illuminated for the user to apply a localized force input at the appropriate sensor node positioned on the applique 28 to activate the unlock/release of the latch mechanism 38. False activations of the touch and gesture pad 30 due to water are reduced or eliminated, as a result of water or rain being incapable of activating the mechanical switch assembly 245. In the configuration where the mechanical switch assembly 245 includes a force based switch 247, a hidden force based switch provided behind a continuous class-A surface is therefore provided. It is recognized that the force based switch 247 may be provided in the aperture or port 261 for receiving a direct input from a user's finger 33.

Figure 8D:
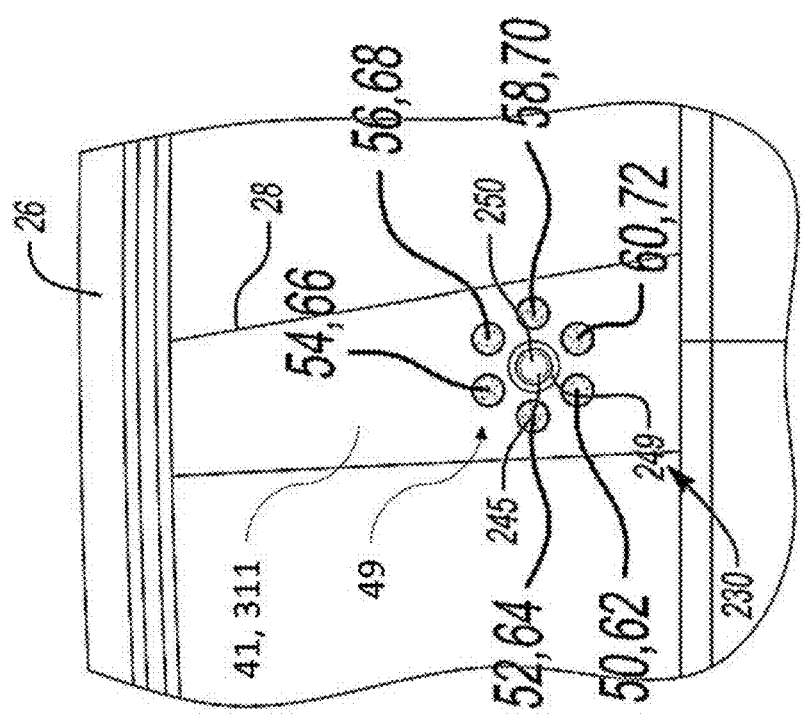

With reference to FIG. 8D, in another configuration, the controller unit 232 is also configured to detect a non-linear sequence or pattern activation of the plurality of capacitive sensors 50, 52, 54, 56, 58, 60 (e.g., proximity sensors 49) in the configuration the plurality of capacitive sensors 50, 52, 54, 56, 58, 60 (e.g., proximity sensors 49) are provided in lieu of the single capacitive sensor 250, and confirm the end of the inputted activation pattern or sequence in response to the movement/activation of the mechanical switch assembly 245. If the controller does not detect a movement/activation of the mechanical switch assembly 245 within a predetermined time of the last activation of one the of the plurality of capacitive sensors 50, 52, 54, 56, 58, 60, the controller unit 232 classifies the activation of one the of the plurality of capacitive sensors 50, 52, 54, 56, 58, 60 as a false activation, and may enter a low power stand-by state in response. In such a case, the controller unit 232 may not need to rely on communication with the plurality of vehicle controllers 242 (e.g., an authentication system) before controlling the latch mechanism 238 since an authenticated gesture sequence provides identity confirmation such that there would not be a need to confirm that a key fob providing identify and authentication information is detected. Furthermore, the controller unit 232 may be configured to power on the plurality of capacitive sensors 50, 52, 54, 56, 58, 60 only subsequent to a detected force input to the force based switch 247, eliminating the requirement of continuously powering and polling the plurality of capacitive sensors 50, 52, 54, 56, 58, 60 in anticipation of a user's intent to unlock/power release the latch mechanism 38. Power drawn from the power source 44 or the backup energy source 243 may be conserved or eliminated as a result of the plurality of capacitive sensors 50, 52, 54, 56, 58, 60 only being operated when a force based input to the switch 247 is detected; rain or other objects will not falsely generate a force based input to the switch 247 or falsely activate the deactivated plurality of capacitive sensors 50, 52, 54, 56, 58, 60, and the controller unit 232 may be configured to only poll the force based switch 247, thereby reducing power consumption associated with continuously activating capacitive based access sensors, or other power consuming proximity type sensors.

Figure 9B:
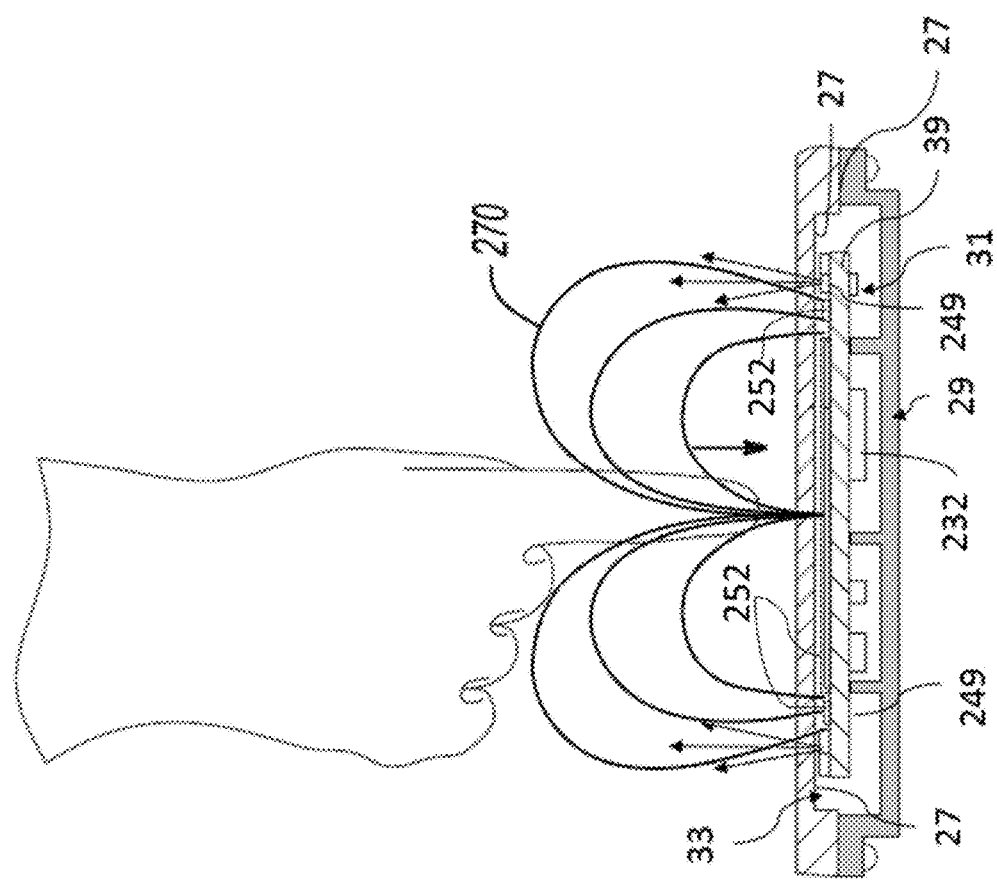
FIG. 9B illustrates a cross-sectional view of a force based switch of the mechanical switch assembly and a capacitive sensor, according to aspects of the disclosure.
Figure 10B:
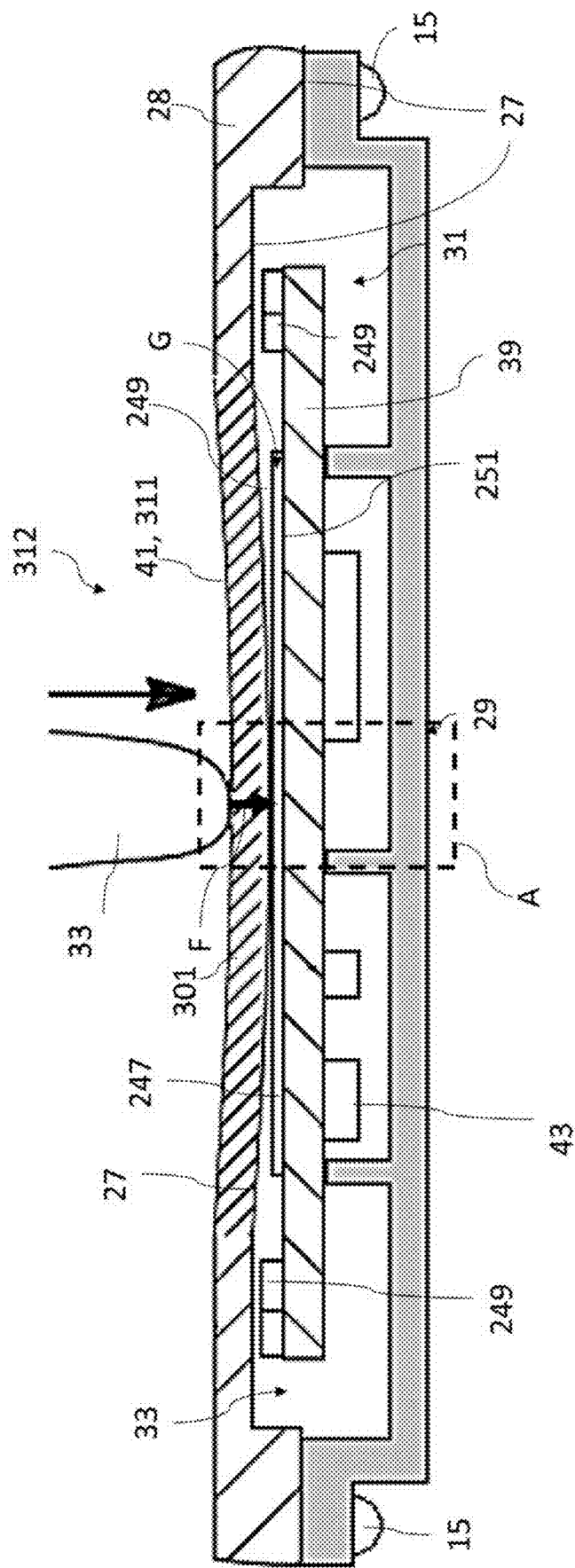
FIGS. 10B to 10D illustrate enlarged cross-sectional views of an activation of the force based switch of the mechanical switch assembly of FIGS. 9A and 10A provided behind a Class A-surface of a vehicle applique, according to aspects of the disclosure.
Figure 10D:
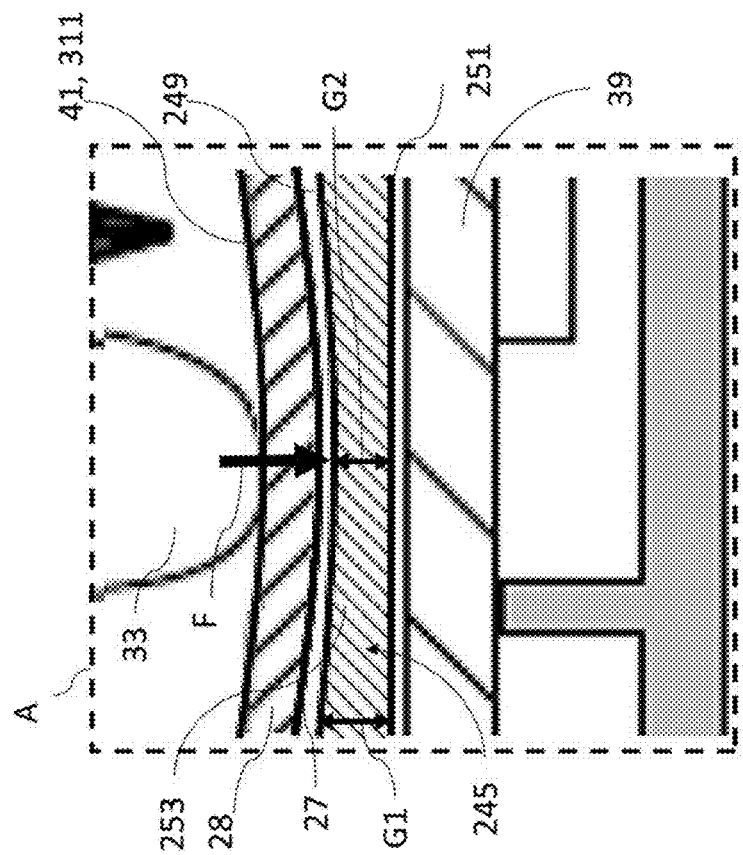
Figure 10C:
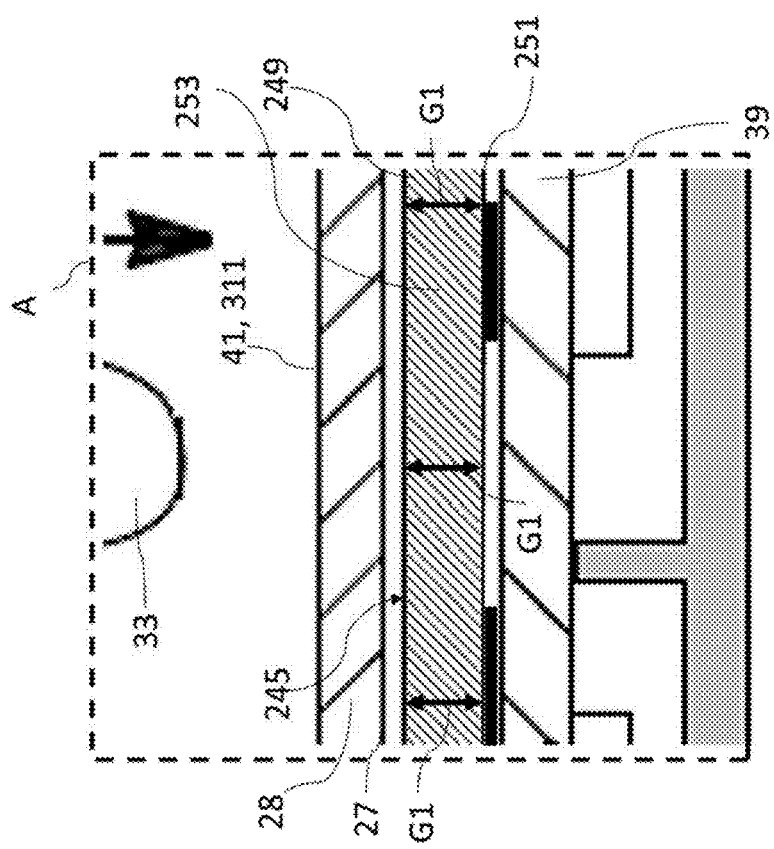

According to an aspect and as shown in the figures, the switch 247 is disposed behind the capacitive sensor 250 (e.g., a moveable button supporting the electrodes 252 of capacitive sensor 250). Placing the switch 247 behind the capacitive sensor 250, when the user soft touches the capacitive sensor 250, the capacitive sensor 250 can be activated before the switch 247 is activated. In another embodiment, the switch 247 is not disposed behind the capacitive sensor 250 (e.g. no capacitive sensor 250 is associated with the switch 247), but rather may be provided adjacent. The capacitive sensor 250 and indicator light emitting diode(s) 249 can be disposed on a switch printed circuit board 262 (PCB) and coupled to the controller unit 232. A switch housing 264 encases the switch printed circuit board 262. At least one spring 266 is disposed between the switch printed circuit board 262 and the switch housing 264 (e.g., a bottom of the switch housing 264). The switch 247 (e.g., a microswitch) is disposed between the switch printed circuit board 262 and the switch housing 264 and configured to be switched or activated as the capacitive sensor 250 and switch printed circuit board 262 are pushed into the switch housing 264 against the at least one spring 266. The mechanical switch assembly 245 may include a frame 268 surrounding and supporting the switch printed circuit board 262, thus the at least one spring 266 supports the frame 268, which supports the switch printed circuit board 262. According to another aspect, the at least one spring 266 may be a single spring 266 disposed centrally (e.g., extending about the switch 247) between the frame 268 and the switch housing 264. Operation of the mechanical switch assembly 245 is shown in FIGS. 9 and 10. Specifically, in FIG. 9, a user can activate the capacitive sensor 250 (e.g., causing a change in electromagnetic field 270) during one mode of operation (i.e., soft touch), but as shown in FIG. 10, the user may activate the switch 247 of the mechanical switch assembly 245 with additional force. An alternate operation can be provided, for example the user can activate, the user may activate the switch 247 of the mechanical switch assembly 245 with additional force (e.g. hard touch), to activate the capacitive sensor 250 (e.g., causing a generation and sensing of a change of electromagnetic field 270) during one mode of operation (i.e., soft touch). In accordance with an embodiment illustrated in FIG. 9B, the mechanical switch 247 of FIG. 9 is replaced with the force based switch 247 of FIGS. 9A and 10A and capacitive electrodes 252 forming the capacitive sensor 250 are provided on the PCB 39.

The mechanical switch assembly 245 may be configured to be diagnosed by the controller unit 232. Specifically, as best shown in FIGS. 11 and 12, the mechanical switch assembly 245 can further include at least one resistor 272 connected in series with the switch 247 for diagnosing the mechanical switch assembly 245. The at least one resistor 272 in series can, for example allow a different voltage to be detected at an input to a microcontroller (e.g., controller unit 232). The mechanical switch assembly 245 can alternatively or additionally include at least one capacitor 274 (FIG. 12) connected in parallel with the switch 247, which can also allow for diagnosing the mechanical switch assembly 245.

According to another aspect of the disclosure, and best shown in FIG. 13 the plurality of pins 248 of the mechanical switch assembly 245 can include three pins 248, e.g., a single pole dual throw (SPDT) switch configuration, with each of the three pins 248 electrically coupled to the controller unit 232 (e.g., the third pin 248 providing additional diagnostic capabilities). According to another aspect of the disclosure, and best shown in FIG. 13 the plurality of pins 248 of the force-based switch 247 can include three pins 248, for supplying ground and voltage references to the force-based switch 247 for detecting a change of capacitance as a result of a change in a gap, or other switch property, as described herein above as an example.

Figure 14:
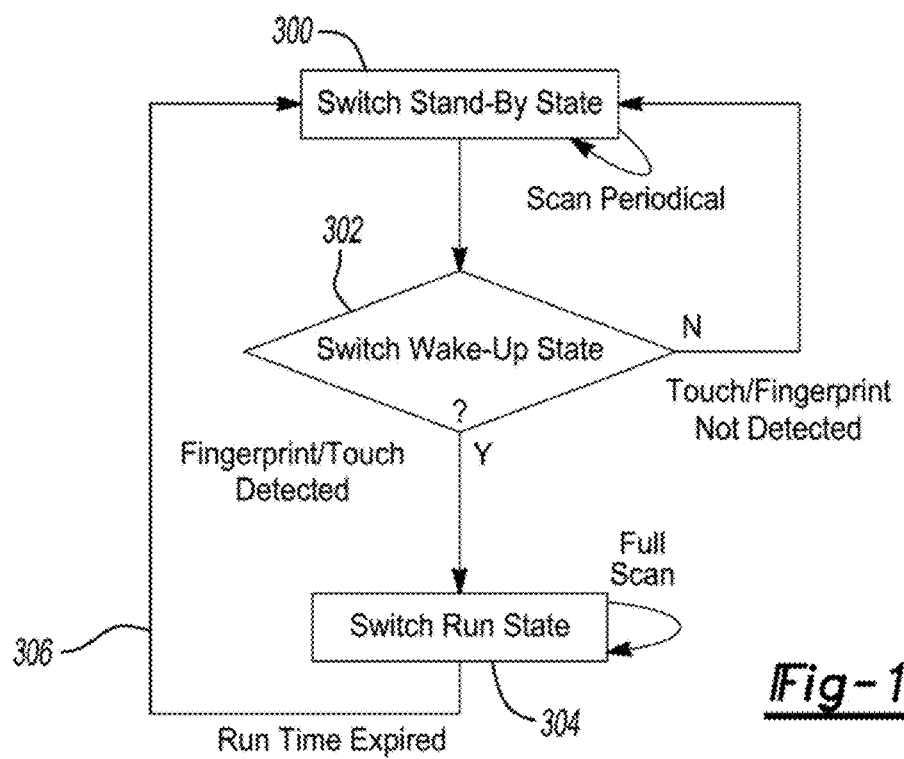
FIG. 14 illustrates a method of operating the second exemplary embodiment of the touch and gesture pad to sense an input according to aspects of the disclosure.

As illustrated in FIG. 14, a method of operating a touch and gesture pad 230 to sense an input (e.g., touch or fingerprint) begins with the step of 300 maintaining a controller unit 232 in a stand-by state. Block 300 indicates the capacitive sensor 250 (e.g. at least one proximity sensor 49) is operational in its low power (i.e., lower quiescent current) condition. A low frequency scan of the status of the capacitive sensor 250 is performed. A decision block 302 determines whether a touch or swipe input has been detected. If not, mechanical switch assembly 245 is maintained in its stand-by mode. If yes, mechanical switch assembly 245 is shifted into a wake-up state. The controller unit 232 alters the illumination of the at least one indicator light emitting diode 249 to illuminate a lighted ring 251 surrounding the mechanical switch assembly 245 for notifying the user of the location of the mechanical switch assembly 245. Thus, thereafter, a tap (i.e., force input) inputted to the mechanical switch assembly 245 shifts it into its Run state, as shown, at block 304, and allows the subsequent force input to perform either of a desired (e.g., Lock or an Unlock, or a power release) function. A high frequency scan is performed in the Run state and mechanical switch assembly 245 is now functioning in a high power (i.e., high quiescent current) condition. Line 306 indicates that the force input into the mechanical switch assembly 245 must be completed within a predetermined time period after the touch or swipe input has been detected to authenticate the input to confirm the activation is not a false activation. If the force input is not detected after expiration of the time period, mechanical switch assembly 245 returns to its stand-by state.

In accordance with another illustrative method, and with reference to FIG. 15, a method of operating a touch and gesture pad 230 to sense an input (e.g., touch or fingerprint) begins with the step of 300' maintaining a controller unit 32 in a stand-by state. Block 300' indicates the mechanical switch assembly 245 and the plurality of capacitive sensors 50, 52, 54, 56, 58, 60 (e.g. proximity sensors 49) are operational in their low power (i.e., lower quiescent current) condition. A low frequency scan of the status of the mechanical switch assembly 245 is performed. A decision block 302' determines whether a force input has been detected inputted to the mechanical switch assembly 245. If not, mechanical switch assembly 245 is maintained in its stand-by mode and the plurality of capacitive sensors 50, 52, 54, 56, 58, 60 (e.g., proximity sensors 49) are or remain deactivated (e.g., lower power, low quiescent current or off mode). If decision block 302' determines a force input has been detected and inputted to the mechanical switch assembly 245, the plurality of capacitive sensors 50, 52, 54, 56, 58, 60 (e.g., proximity sensors 49) are shifted into a wake-up state. Thereafter, a gesture sequence (i.e., a touch or swipe input), for example a non-linear sequence gesture inputted to the plurality of capacitive sensors 50, 52, 54, 56, 58, 60 shifted into its Run state by the controller unit 32, as shown, at block 304', and allows the subsequent gesture sequence to perform either of a desired (e.g., Lock or an Unlock, or a power release) function. A high frequency scan is performed in the Run state and the plurality of capacitive sensors 50, 52, 54, 56, 58, 60 are now operating e.g. functioning in a high power (i.e., high quiescent current) condition. Line 306' indicates that the sequence input into the plurality of capacitive sensors 50, 52, 54, 56, 58, 60 must be completed within a predetermined time period after the decision block 302' determines a force input has been detected and inputted to the mechanical switch assembly 245 to authenticate the gesture input. If the touch or gesture input is not authenticated after expiration of the time period, the plurality of capacitive sensors 50, 52, 54, 56, 58, 60 returns to its stand-by or off state.

In an alternate embodiment, operation of the mechanical switch assembly 245 may be combined with operation of the plurality of capacitive sensors 50, 52, 54, 56, 58, 60. For example, the mechanical switch assembly 245 may be disposed behind or adjacent or centered about to one of the plurality of capacitive sensors 50, 52, 54, 56, 58, 60, or at the terminating node of a non-linear arrangement of sensors 49 as illustrated in FIGS. 5C and 5D. The mechanical switch assembly 245 may be disposed adjacent to one of the plurality of capacitive sensors 50, 52, 54, 56, 58, 60, or at the initiating node of a non-linear arrangement of sensors 49. Providing the mechanical switch assembly 245 as part of the non-linear node arrangement integrates activation of a mechanical forced based switch and gesture sensors as part of a single uninterrupted sequence (e.g., without having to "jump" over sensors to reposition the finger). Requiring the sequence input as described hereinabove, alone or in combination with actuation of the switch 247 of the mechanical switch assembly 245 can further ensure avoidance of inadvertent inputs which can, for example, be caused by rain, flying debris or carwash spray jets contacting the plurality of capacitive sensors 50, 52, 54, 56, 58, 60 associated with the touch and gesture pad 30.

Now referring to FIG. 16, there is illustratively provided a method of operating a touch and gesture pad to sense a gesture 400, comprising the steps of (1) maintaining 402 a controller unit 232 in a stand-by state (e.g. low power or off mode), periodically scanning 403 using the controller unit 232 in the stand-by state for an activation of one of at least one proximity sensor 49 (e.g. sensor 250, or a plurality of capacitive sensors 50, 52, 54, 56, 58, 60) and a force based sensor 247, (2) transitioning 404 the controller unit 232 from the stand-by state to an active state (e.g. operating power or on mode) in response to detecting an activation of one of at least one proximity sensor 49 and the force based sensor 247, and (3) determining 406 using the controller unit 232 in the active state whether a subsequent activation of the other one of the at least one proximity sensor 49 and the force based sensor 247 is completed before a predetermined time (e.g. 3 seconds as a non-limiting example) elapses in response to detecting using the controller unit 232 in the stand-by state the previous activation of one of the at least one proximity sensor 49 and the force based sensor 247. The method of operating a touch and gesture pad to sense a gesture 400 may further include the step of activating one of a plurality of indicator LEDs 62, 64, 66, 68, 70, 72 each associated with the one of the plurality of capacitive sensors 50, 52, 54, 56, 58, 60 (e.g. proximity sensors 49) and the lighted ring 251 in response to using the controller unit 232 in the active state for detection of an activation of the other one of the at least one proximity sensor 49 and the force based sensor 247.

While reference herein is made to capacitive based sensors, other proximity sensors may be employed, such as ultrasonic, resistive, optical, radar or the like, for detecting touch, gestures, or fingerprints.

Clearly, changes may be made to what is described and illustrated herein without departing from the scope defined in the accompanying claims. The touch and gesture pad 30, 230 may be operable for any kind of different closure device incorporated within the motor vehicle 10, for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example touch and gesture pad 30, 230 can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A touch and gesture pad for providing access to a vehicle, comprising:
    a cover plate assembly having an exterior surface and an inner surface;
    a plurality of proximity sensors spaced from one another defining a plurality of sensor nodes for receiving an input from a user in the form of a touch or a swipe;
    a mechanical switch assembly disposed behind said cover plate assembly and hidden behind said exterior surface and modifiable between a rest state and an activated state in response to a force input on said mechanical switch assembly from said inner surface of said cover plate assembly transferred from a force input by the user on said exterior surface of said cover plate assembly; and a controller unit coupled to said plurality of proximity sensors and said mechanical switch assembly, and in communication with a latch mechanism and configured to:

detect a plurality of activations of said plurality of proximity sensors due to the input, detect an activation of said mechanical switch assembly, determine whether the plurality of activations of said plurality of proximity sensors matches a gesture sequence, and control the latch mechanism in response to the activation of said mechanical switch assembly and the plurality of activations of said plurality of proximity sensors matching the gesture sequence.

2. The touch and gesture pad as set forth in claim 1, wherein said plurality of proximity sensors are a plurality of capacitive sensors defining said plurality of sensor nodes for receiving a touch input from the user in the form of a touch or a swipe, said controller unit is coupled to said plurality of capacitive sensors and is further configured to:

detect a plurality of changes in capacitance of said plurality of capacitive sensors due to the touch or the swipe, determine whether the plurality of changes in capacitance matches the gesture sequence, and control the latch mechanism in response to the plurality of changes in capacitance matching the gesture sequence.

3. The touch and gesture pad as set forth in claim 1, wherein said controller unit is further configured to determine whether the plurality of activations of said plurality of proximity sensors matches the gesture sequence within a predetermined amount of time and control the latch mechanism in response to the plurality of activations of said plurality of proximity sensors matching the gesture sequence within the predetermined amount of time.

4. The touch and gesture pad as set forth in claim 2, further including a plurality of indicator light emitting diodes coupled to said controller unit for illuminating said sensor nodes, wherein said controller unit is further configured to alter an illumination of said plurality of indicator light emitting diodes in response to the plurality of changes in capacitance being attributed to a corresponding each one of said plurality of capacitive sensors.

5. The touch and gesture pad as set forth in claim 4, wherein the altering of the illumination is selected from the group consisting of: altering the illumination from one color to another, and altering the illumination between an off state and an on state.

6. The touch and gesture pad as set forth in claim 2, wherein said plurality of proximity sensors are circumferentially spaced from one another in one of a circular arrangement and a partially circular arrangement.

7. The touch and gesture pad as set forth in claim 2, wherein said mechanical switch assembly includes a switch movable between a rest position and a displaced position in response to a force input from a user transferred through said cover plate assembly, wherein said controller unit is further configured to:

detect movement of said switch to the displaced position due to a change in capacitance of said switch occurring within a predetermined amount of time of the plurality of activations of said plurality of proximity sensors matching the gesture sequence, and control the latch mechanism.

8. The touch and gesture pad as set forth in claim 7 further including at least one indicator light emitting diode coupled to said controller unit to provide an indication of the operation of at least one of said plurality of capacitive sensors and said switch.

9. The touch and gesture pad as set forth in claim 8, wherein said controller unit is further configured to alter the illumination of said at least one indicator light emitting diode in response to the change in capacitance and movement of said switch.

10. The touch and gesture pad as set forth in claim 7, wherein said plurality of capacitive sensors and said mechanical switch assembly are disposed behind an applique not having an aperture for said mechanical switch assembly.

11. The touch and gesture pad as set forth in claim 10, wherein said switch is movable between a rest position and an activated position in response to a force input from a user applied to said cover plate assembly causing said cover plate assembly to deform and contact said mechanical switch assembly.

12. The touch and gesture pad as set forth in claim 1, further including a plurality of indicator light emitting diodes coupled to said controller unit for illuminating said sensor nodes.

13. A vehicle applique comprising:

a touch and gesture pad providing access to a vehicle, said touch and gesture pad comprising a mechanical switch assembly hidden behind an exterior surface of said vehicle applique and a plurality of proximity sensors spaced from one another defining a plurality of sensor nodes for receiving an input from a user in the form of a touch or a swipe, said mechanical switch assembly including a switch modifiable between a rest state and an activated state in response to a force input transferred through said vehicle applique in response to a force input by the user on said exterior surface of said vehicle applique, and a controller unit coupled to said mechanical switch assembly and said plurality of proximity sensors and in communication with a latch mechanism and configured to detect an activation of said switch due to the force input and control the latch mechanism in response to the activation of said switch.

14. The vehicle applique as set forth in claim 13, wherein said exterior surface is continuous and uninterrupted by an aperture formed in said vehicle applique.

15. The touch and gesture pad as set forth in claim 13, wherein said vehicle applique includes a deflectable portion, wherein the force input on said vehicle applique by the user causes said deflectable portion to activate said switch.

16. The vehicle applique as set forth in claim 13, wherein said vehicle applique includes an inner surface, wherein said inner surface is caused to move to contact and activate said mechanical switch assembly in response to the force input on said vehicle applique by the user on said exterior surface of said vehicle applique.

17. The vehicle applique as set forth in claim 13, wherein said mechanical switch assembly comprises an alterable capacitance in response to the force input applied to said mechanical switch assembly by said vehicle applique.

18. The vehicle applique as set forth in claim 17, wherein said controller unit is configured to sense continuous levels of force applied to said mechanical switch assembly in response to the force input by detecting capacitance changes of said switch.

19. A touch and gesture pad for providing access to a vehicle, comprising:
- a cover plate assembly having an exterior surface and an inner surface;
- a plurality of proximity sensors defining a plurality of sensor nodes for receiving an input from a user in the form of a touch or a swipe;
- a mechanical switch assembly modifiable between a rest state and an activated state in response to a force input transferred through said cover plate assembly in response to a force input by the user on said exterior surface of said cover plate assembly;
- said plurality of proximity sensors and said mechanical switch assembly both disposed behind said exterior surface of said cover plate assembly; and
- a controller unit coupled to said plurality of proximity sensors and in communication with a latch mechanism and configured to:
  - detect an activation of said mechanical switch assembly,
  - detect a plurality of activations of said plurality of proximity sensors due to the input,
  - determine whether the plurality of activations of said plurality of proximity sensors matches a gesture sequence, and
  - control the latch mechanism in response to the activation of said mechanical switch assembly and the plurality of activations of said plurality of proximity sensors matching the gesture sequence.

20. The touch and gesture pad of claim 19, further comprising a housing and a backup power source to provide power to said controller unit and said plurality of proximity sensors, wherein said plurality of proximity sensors, said controller unit and said backup power source are housed within said housing.

* * * * *